(12) United States Patent  (10) Patent No.: US 12,202,085 B2
Centner et al.  (45) Date of Patent: Jan. 21, 2025

(54) CONTACT TIP AND RECEIVING ASSEMBLY OF A WELDING TORCH

(71) Applicant: ILLINOIS TOOL WORKS INC., Glenview, IL (US)

(72) Inventors: Robert Joseph Centner, Frankfort, IL (US); Robert Lloyd Warning, Cedar Lake, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 16/987,703

(22) Filed: Aug. 7, 2020

(65) Prior Publication Data

US 2020/0361019 A1   Nov. 19, 2020

Related U.S. Application Data

(63) Continuation of application No. 15/253,414, filed on Aug. 31, 2016, now Pat. No. 10,773,332.

(60) Provisional application No. 62/220,732, filed on Sep. 18, 2015.

(51) Int. Cl.
   *B23K 9/29*   (2006.01)
   *B23K 9/12*   (2006.01)
   *B23K 9/173*  (2006.01)
   *B23K 9/32*   (2006.01)

(52) U.S. Cl.
   CPC ............. *B23K 9/295* (2013.01); *B23K 9/123* (2013.01); *B23K 9/173* (2013.01); *B23K 9/325* (2013.01)

(58) Field of Classification Search
   CPC ........ B23K 9/295; B23K 9/123; B23K 9/173; B23K 9/325
   USPC ........................................ 219/137.31, 137.42
   See application file for complete search history.

(56) References Cited

U.S. PATENT DOCUMENTS

| | | | | |
|---|---|---|---|---|
| 2,297,548 A | * | 9/1942 | Fox ......................... | F16L 37/40 |
| | | | | 251/149.6 |
| 2,756,310 A | * | 7/1956 | Galbraith ............... | B23K 9/123 |
| | | | | 219/137.52 |
| 2,761,049 A | * | 8/1956 | McElrath ............... | B23K 9/295 |
| | | | | 219/137.52 |
| 2,881,305 A | * | 4/1959 | Wojciak ................ | B23K 9/295 |
| | | | | 219/137.44 |

(Continued)

FOREIGN PATENT DOCUMENTS

| CA | 2436141 | 2/2004 |
|---|---|---|
| CA | 2855811 | 5/2013 |

(Continued)

OTHER PUBLICATIONS

Excerpt from Victor Equipment Company Brochure, pp. 24,32,34 (1951).

(Continued)

*Primary Examiner* — Jimmy Chou
(74) *Attorney, Agent, or Firm* — McAndrews, Held & Malloy, Ltd.

(57) ABSTRACT

A welding torch system includes a receiving assembly to receive a contact tip and a welding nozzle. The welding torch system also includes a locking element that retains the contact tip in a partially secure position. Further, the welding torch system includes the welding nozzle configured to couple to the receiving assembly to retain the contact tip in a fully secure position.

9 Claims, 26 Drawing Sheets

(56) References Cited

U.S. PATENT DOCUMENTS

| | | | | |
|---|---|---|---|---|
| 3,007,033 A * | 10/1961 | Newman | B23K 9/1735 | 219/137 R |
| 3,025,387 A * | 3/1962 | Kinney | B23K 9/122 | 219/137.44 |
| 3,083,290 A * | 3/1963 | Kennedy | B23K 9/298 | 219/137 R |
| 3,112,392 A * | 11/1963 | Orr | B23K 9/173 | 219/137.44 |
| 3,121,784 A * | 2/1964 | McGinty | B23K 9/291 | 219/75 |
| 3,210,523 A | 10/1965 | Cotter et al. | | |
| 3,239,647 A * | 3/1966 | Hansheiri | B23K 9/291 | 219/137.44 |
| 3,265,856 A * | 8/1966 | Shelby | B23K 9/295 | 219/137.9 |
| 3,270,179 A * | 8/1966 | Russell | B23K 9/173 | 219/74 |
| 3,283,121 A * | 11/1966 | Bernard | B23K 9/295 | 219/137.44 |
| 3,469,070 A * | 9/1969 | Bernard | B23K 9/123 | 219/137.61 |
| 3,487,194 A * | 12/1969 | Poulton | B23K 9/022 | 219/136 |
| 3,488,468 A * | 1/1970 | Carbone | B23K 9/291 | 219/136 |
| 3,514,570 A * | 5/1970 | Bernard | B23K 9/123 | 403/350 |
| 3,529,126 A * | 9/1970 | Reeh | B23K 9/285 | 219/137.44 |
| 3,529,128 A * | 9/1970 | Cruz, Jr. | F23D 14/54 | 219/137.44 |
| 3,541,298 A * | 11/1970 | Carkhuff | B23K 9/173 | 219/137.63 |
| 3,576,423 A * | 4/1971 | Bernard | B23K 9/123 | 219/136 |
| 3,596,049 A | 7/1971 | Ogden | | |
| 3,597,576 A * | 8/1971 | Bernard | B23K 9/295 | 219/137.43 |
| 3,629,547 A * | 12/1971 | Kester | B23K 9/295 | 219/136 |
| 3,659,076 A * | 4/1972 | Ogden, Sr. | B23K 9/295 | 219/136 |
| 3,676,640 A * | 7/1972 | Bernard | B23K 9/295 | 219/137.43 |
| 3,689,732 A | 9/1972 | Hill | | |
| 3,731,048 A * | 5/1973 | Ogden, Sr. | B23K 9/323 | 219/137.43 |
| 3,825,720 A * | 7/1974 | Zillinger, Jr. | B23K 9/122 | 219/137.44 |
| 3,878,354 A * | 4/1975 | Frantzreb, Sr. | B23K 9/122 | 219/74 |
| 3,934,782 A * | 1/1976 | Cushman | B22D 25/04 | 164/334 |
| 3,940,586 A * | 2/1976 | Stearns | B23K 9/133 | 219/136 |
| 4,008,384 A * | 2/1977 | Cecil | B23K 9/287 | 266/73 |
| 4,049,943 A * | 9/1977 | Pratt | B23K 9/323 | 219/136 |
| 4,158,763 A * | 6/1979 | Moerke | B23K 9/295 | 219/137.44 |
| 4,280,043 A | 7/1981 | Feix et al. | | |
| 4,282,419 A * | 8/1981 | Auer | B23K 9/123 | 219/137.44 |
| 4,297,561 A * | 10/1981 | Townsend | B23K 9/295 | 219/137.42 |
| 4,403,136 A * | 9/1983 | Colman | B23K 9/291 | 219/137.31 |
| 4,482,797 A * | 11/1984 | Shiramizu | B23K 9/28 | 219/137.61 |
| 4,529,863 A * | 7/1985 | Lebel | B23K 9/235 | 219/137.42 |
| 4,554,432 A * | 11/1985 | Raloff | B23K 9/295 | 219/137.43 |
| 4,563,569 A | 1/1986 | Shiramizu et al. | | |
| 4,575,612 A * | 3/1986 | Prunier | B23K 9/123 | 219/137.43 |
| 4,672,163 A | 6/1987 | Matsui et al. | | |
| 4,675,493 A * | 6/1987 | Gartland | H05H 1/3405 | 219/136 |
| 4,731,518 A * | 3/1988 | Parmelee | B23K 9/123 | 219/137.9 |
| 4,733,052 A * | 3/1988 | Nilsson | B23K 9/123 | 219/137.44 |
| 4,767,908 A | 8/1988 | Dallavalle et al. | | |
| 4,866,246 A * | 9/1989 | Church | B23K 9/125 | 219/136 |
| 4,945,208 A * | 7/1990 | Lian | B23K 9/291 | 219/137.44 |
| 4,954,688 A | 9/1990 | Winterfeldt | | |
| 4,978,831 A * | 12/1990 | Lian | B23P 15/24 | 219/137.61 |
| 4,994,707 A * | 2/1991 | Stark | H01K 1/40 | 313/271 |
| 5,013,885 A * | 5/1991 | Carkhuff | H05H 1/34 | 219/121.48 |
| 5,132,513 A * | 7/1992 | Ingwersen | B23K 9/295 | 219/137.9 |
| 5,258,599 A * | 11/1993 | Moerke | B23K 9/295 | 219/121.48 |
| 5,260,546 A * | 11/1993 | Ingwersen | B23K 9/295 | 219/137.9 |
| 5,338,917 A * | 8/1994 | Stuart | B23K 9/323 | 219/137.61 |
| 5,349,158 A * | 9/1994 | Mari | B23K 9/285 | 219/137.62 |
| 5,380,980 A * | 1/1995 | Colling | B23K 9/32 | 219/137.31 |
| 5,440,100 A * | 8/1995 | Stuart | B23K 9/287 | 219/137.61 |
| 5,491,321 A * | 2/1996 | Stuart | B23K 9/287 | 219/137.41 |
| 5,556,562 A * | 9/1996 | Sorenson | B23K 9/295 | 219/137.61 |
| 5,635,090 A * | 6/1997 | Lubieniecki | B23K 9/173 | 219/136 |
| 5,669,556 A * | 9/1997 | Yoshida | B23K 9/295 | 239/105 |
| 5,726,420 A * | 3/1998 | Lajoie | B23K 9/173 | 219/137.61 |
| 5,760,373 A * | 6/1998 | Colling | B23K 9/32 | 219/137.61 |
| 5,772,102 A | 6/1998 | New et al. | | |
| 6,075,227 A * | 6/2000 | Lajoie | B23K 9/123 | 219/137.61 |
| 6,078,023 A | 6/2000 | Jones et al. | | |
| 6,163,008 A * | 12/2000 | Roberts | H05H 1/34 | 219/121.48 |
| 6,191,380 B1 | 2/2001 | Thomas | | |
| 6,225,599 B1 | 5/2001 | Alterkruse | | |
| 6,271,497 B1 | 8/2001 | Zapletal | | |
| 6,307,179 B1 * | 10/2001 | Walters, III | B23K 9/26 | 219/137.42 |
| 6,444,950 B1 * | 9/2002 | Altekruse | B23K 9/173 | 219/137.42 |
| 6,525,297 B2 * | 2/2003 | Doherty | B23K 9/173 | 219/137.44 |
| 6,657,162 B1 | 12/2003 | Jung et al. | | |
| 6,689,987 B2 * | 2/2004 | Altekruse | B23K 9/26 | 219/137.42 |
| 6,744,013 B2 * | 6/2004 | Jones | B23K 9/295 | 219/137.42 |
| 6,847,009 B2 * | 1/2005 | Stuart | B23K 9/26 | 219/137.42 |
| 6,852,950 B2 * | 2/2005 | Giese | B23K 9/295 | 219/137.42 |
| 6,888,093 B2 * | 5/2005 | Hardwick | H05H 1/34 | 219/121.48 |

(56) References Cited

U.S. PATENT DOCUMENTS

| | | | | |
|---|---|---|---|---|
| 6,924,461 B2* | 8/2005 | Matiash | B23K 9/323 | 219/137.42 |
| 7,105,775 B2* | 9/2006 | Giese | B23K 9/173 | 219/137.42 |
| 7,176,412 B2* | 2/2007 | Wells | B23K 9/32 | 219/137.61 |
| 7,244,909 B2* | 7/2007 | Kensrue | B23K 9/28 | 219/137.31 |
| 7,271,366 B2* | 9/2007 | Kensrue | B23K 9/295 | 219/137.61 |
| 7,342,200 B2* | 3/2008 | Eberle | B23K 9/295 | 219/137.31 |
| 7,381,923 B2* | 6/2008 | Gordon | B23K 9/123 | 219/137.61 |
| 7,576,300 B2* | 8/2009 | Giese | B23K 9/282 | 219/137.61 |
| 7,663,074 B2* | 2/2010 | Wells | B23K 9/32 | 219/137.31 |
| 7,905,741 B1* | 3/2011 | Wade | H01R 13/639 | 439/321 |
| 8,304,693 B2* | 11/2012 | Ma | B23K 9/123 | 219/137 WM |
| 8,338,753 B2* | 12/2012 | Kachline | B23K 9/123 | 219/137.44 |
| 8,633,422 B2* | 1/2014 | Giese | B23K 9/282 | 219/137.44 |
| 9,302,341 B2* | 4/2016 | Oh | B23K 9/26 | |
| 9,308,599 B2* | 4/2016 | Sadowski | B23K 9/26 | |
| 9,364,915 B2* | 6/2016 | Meess | B23K 9/295 | |
| 9,527,155 B2* | 12/2016 | Meess | B23K 9/26 | |
| 9,539,663 B2* | 1/2017 | Grossauer | B23K 9/1336 | |
| 9,669,486 B2* | 6/2017 | Dingeldein | B23K 9/295 | |
| 9,950,386 B2* | 4/2018 | Cooper | B23K 9/26 | |
| 10,052,708 B2* | 8/2018 | Redding | B21D 19/00 | |
| 10,155,280 B2* | 12/2018 | Cooper | B23K 9/173 | |
| 10,286,477 B2* | 5/2019 | Kachline | B23K 9/296 | |
| 10,543,558 B2* | 1/2020 | Meess | B23K 9/295 | |
| 10,773,332 B2* | 9/2020 | Centner | B23K 9/295 | |
| 10,882,133 B2* | 1/2021 | Jansma | B23K 9/323 | |
| 2002/0113046 A1* | 8/2002 | Altekruse | B23K 9/173 | 219/137.42 |
| 2002/0113047 A1* | 8/2002 | Doherty | B23K 9/173 | 219/137.42 |
| 2002/0117484 A1* | 8/2002 | Jones | H05H 1/34 | 219/121.57 |
| 2003/0057196 A1* | 3/2003 | Jones | B23K 9/295 | 219/137.42 |
| 2003/0209530 A1* | 11/2003 | Stuart | B23K 9/173 | 219/137.61 |
| 2004/0026394 A1* | 2/2004 | Giese | B23K 9/295 | 219/137.42 |
| 2004/0026395 A1* | 2/2004 | Giese | B23K 9/295 | 219/137.61 |
| 2004/0079741 A1* | 4/2004 | Keegan | B23K 9/122 | 219/137.61 |
| 2004/0079784 A1* | 4/2004 | Giese | B23K 9/295 | 228/44.3 |
| 2005/0109738 A1* | 5/2005 | Hewett | B23K 10/00 | 219/121.48 |
| 2005/0218132 A1* | 10/2005 | Wells | B23K 9/291 | 219/137.61 |
| 2006/0151453 A1* | 7/2006 | Gordon | B23K 9/123 | 219/137.61 |
| 2006/0226132 A1* | 10/2006 | Giese | B23K 9/285 | 219/137.31 |
| 2006/0226133 A1* | 10/2006 | Giese | B23K 9/323 | 219/137.31 |
| 2006/0226134 A1* | 10/2006 | Giese | B23K 9/323 | 219/137.31 |
| 2006/0289413 A1* | 12/2006 | Eberle | B23K 9/295 | 219/137.31 |
| 2007/0056945 A1* | 3/2007 | Hammen | B23K 9/295 | 219/137.43 |
| 2007/0062922 A1* | 3/2007 | Zamuner | B23K 9/295 | 219/137.31 |
| 2007/0108173 A1* | 5/2007 | Zamuner | B23K 9/287 | 219/137.31 |
| 2007/0210049 A1* | 9/2007 | Dingeldein | B23K 9/295 | 219/137.61 |
| 2008/0035623 A1* | 2/2008 | Hutchison | B23K 9/325 | 219/136 |
| 2008/0272101 A1* | 11/2008 | Oh | B23K 9/173 | 29/469 |
| 2009/0107958 A1* | 4/2009 | Khakhalev | F23D 14/40 | 219/74 |
| 2009/0152255 A1* | 6/2009 | Ma | B23K 9/295 | 219/137.61 |
| 2010/0012637 A1* | 1/2010 | Jaeger | B23K 9/325 | 219/136 |
| 2010/0206852 A1* | 8/2010 | Ohkubo | B23K 9/123 | 219/108 |
| 2011/0006048 A1* | 1/2011 | Ma | B23K 9/173 | 219/137.61 |
| 2011/0006522 A1* | 1/2011 | Bichler | B23K 9/295 | 285/420 |
| 2011/0266259 A1* | 11/2011 | Kachline | B23K 9/173 | 219/136 |
| 2012/0125903 A1* | 5/2012 | Izutani | B23K 9/26 | 219/136 |
| 2013/0112661 A1* | 5/2013 | Dambra | B23K 9/32 | 219/74 |
| 2013/0126504 A1* | 5/2013 | Hassan | B23K 9/291 | 219/137.42 |
| 2013/0126505 A1 | 5/2013 | Hassan et al. | | |
| 2013/0126506 A1 | 5/2013 | Hassan | | |
| 2013/0134143 A1 | 5/2013 | Hassan et al. | | |
| 2013/0193117 A1* | 8/2013 | Wada | B23K 9/167 | 219/75 |
| 2014/0021183 A1* | 1/2014 | Peters | B23K 9/173 | 219/130.51 |
| 2014/0091071 A1* | 4/2014 | Dingeldein | B23K 9/295 | 219/137.42 |
| 2014/0131336 A1* | 5/2014 | Jacques | B23K 9/323 | 219/137.63 |
| 2014/0251972 A1* | 9/2014 | Garvey | H01R 4/56 | 219/137.61 |
| 2014/0263250 A1* | 9/2014 | Meess | B23K 9/26 | 219/137.42 |
| 2014/0263251 A1* | 9/2014 | Enyedy | B23K 9/325 | 219/137.42 |
| 2014/0263253 A1* | 9/2014 | Meess | B23K 9/26 | 219/137.42 |
| 2014/0263254 A1* | 9/2014 | Enyedy | B23K 9/287 | 219/137.52 |
| 2014/0312023 A1* | 10/2014 | Centner | B23K 9/291 | 219/137.42 |
| 2014/0374399 A1* | 12/2014 | Kachline | B25J 19/00 | 294/213 |
| 2015/0129570 A1* | 5/2015 | Redding | B23K 9/285 | 219/137.31 |
| 2015/0129571 A1 | 5/2015 | Hassan | | |
| 2015/0129572 A1* | 5/2015 | Hassan | B23K 9/173 | 219/137.62 |
| 2015/0135796 A1* | 5/2015 | Hassan | B23K 9/295 | 72/476 |
| 2015/0136747 A1* | 5/2015 | Hassan | B23K 9/26 | 219/137.52 |
| 2015/0136748 A1 | 5/2015 | Hassan et al. | | |
| 2015/0136749 A1 | 5/2015 | Hassan et al. | | |
| 2015/0165542 A1* | 6/2015 | Hassan | B23K 9/295 | 219/137.42 |
| 2015/0190879 A1* | 7/2015 | Kachline | B23K 9/287 | 219/137.42 |
| 2015/0273615 A1* | 10/2015 | Cooper | B23K 9/26 | 219/137.42 |
| 2015/0273616 A1* | 10/2015 | Cooper | B23K 9/295 | 219/137.42 |

(56) References Cited

U.S. PATENT DOCUMENTS

| | | | | |
|---|---|---|---|---|
| 2016/0082540 A1* | 3/2016 | Hassan | ............... | B23K 9/164 |
| | | | | 219/137.42 |
| 2016/0144446 A1* | 5/2016 | Centner | ............... | B23K 9/173 |
| | | | | 219/137.61 |
| 2016/0311050 A1* | 10/2016 | Cooper | ............... | B23K 9/295 |
| 2017/0080510 A1* | 3/2017 | Centner | ............... | B23K 9/287 |
| 2017/0080512 A1* | 3/2017 | Centner | ............... | B23K 9/295 |
| 2017/0129037 A1* | 5/2017 | Kachline | ............... | B23K 9/296 |
| 2017/0165780 A1* | 6/2017 | Centner | ............... | B23K 9/16 |
| 2017/0282278 A1* | 10/2017 | Centner | ............... | B23K 9/173 |
| 2018/0214972 A1* | 8/2018 | Jansma | ............... | B23K 9/295 |
| 2019/0047072 A1* | 2/2019 | Mukai | ............... | B23K 9/164 |
| 2020/0361019 A1* | 11/2020 | Centner | ............... | B23K 9/325 |
| 2022/0001480 A1* | 1/2022 | Basit | ............... | B23K 9/323 |
| 2022/0080521 A1* | 3/2022 | Ma | ............... | H01R 35/04 |

FOREIGN PATENT DOCUMENTS

| | | | | |
|---|---|---|---|---|
| CH | 509127 | | 6/1971 | |
| DE | 202013102979 | | 7/2013 | |
| EP | 1388388 | | 2/2004 | |
| EP | 1764179 A2 | * | 3/2007 | ............. B23K 9/123 |
| EP | 2457682 | | 5/2012 | |
| FR | 2291819 | | 11/1974 | |
| FR | 2291819 A1 | | 6/1976 | |
| JP | H05196022 U | | 8/1976 | |
| JP | 5290444 | | 7/1977 | |
| JP | S55156680 A | | 12/1980 | |
| JP | S57134279 A | | 8/1982 | |
| WO | 0073700 A1 | | 12/2000 | |
| WO | 2007030720 | | 3/2007 | |
| WO | 2008018979 | | 4/2008 | |

OTHER PUBLICATIONS

Excerpt from Victor Equipment Company Welding and Cutting Equipment Brochure, Catalog 20C 10-51 CW (1965).
International Search Report from PCT application No. PCT/US2016/050164, dated Dec. 2, 2016, 10 pgs.
Canada Patent Office, Office Action, Application No. 3,194,286, dated Aug. 9, 2024, 6 pages.

* cited by examiner

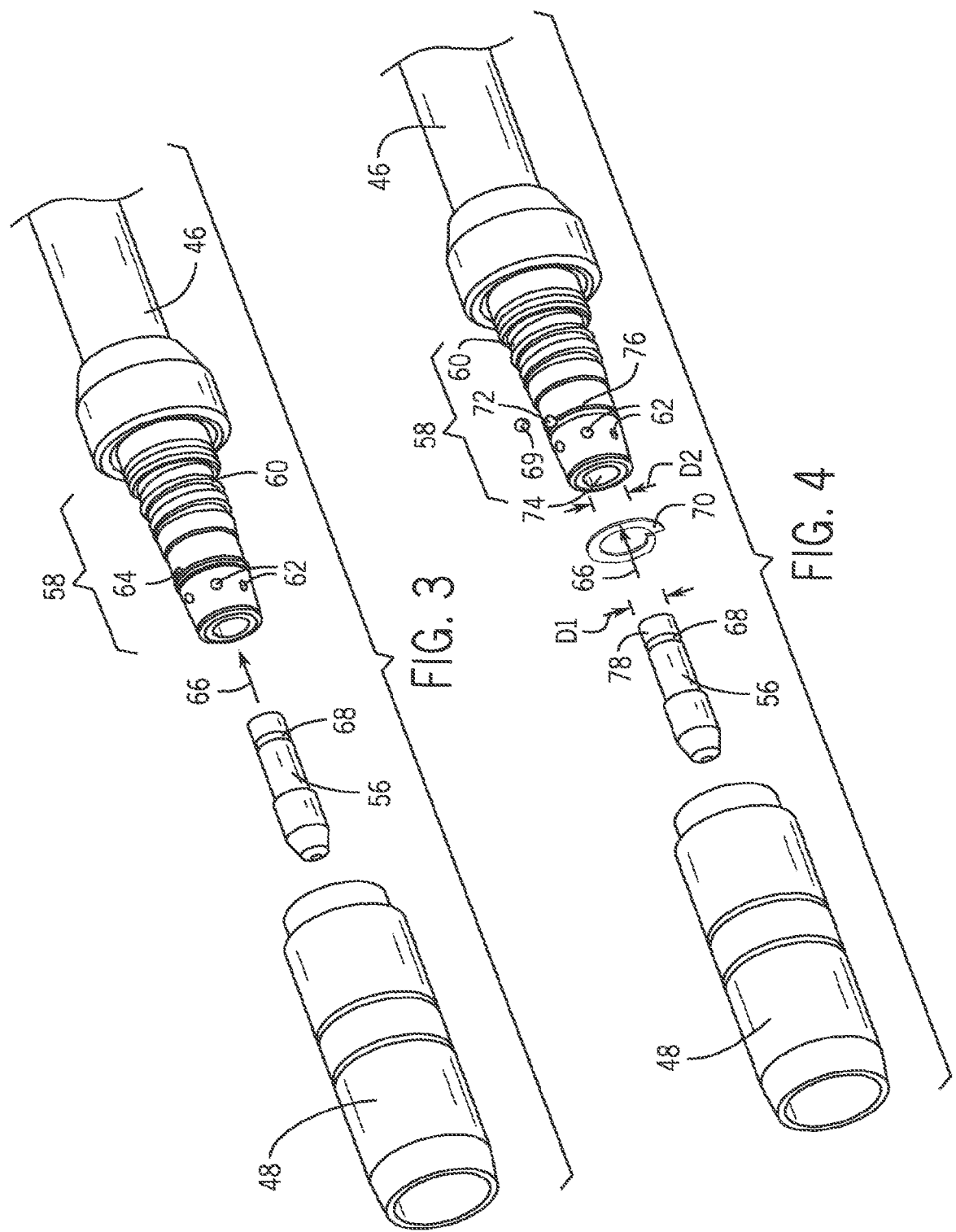

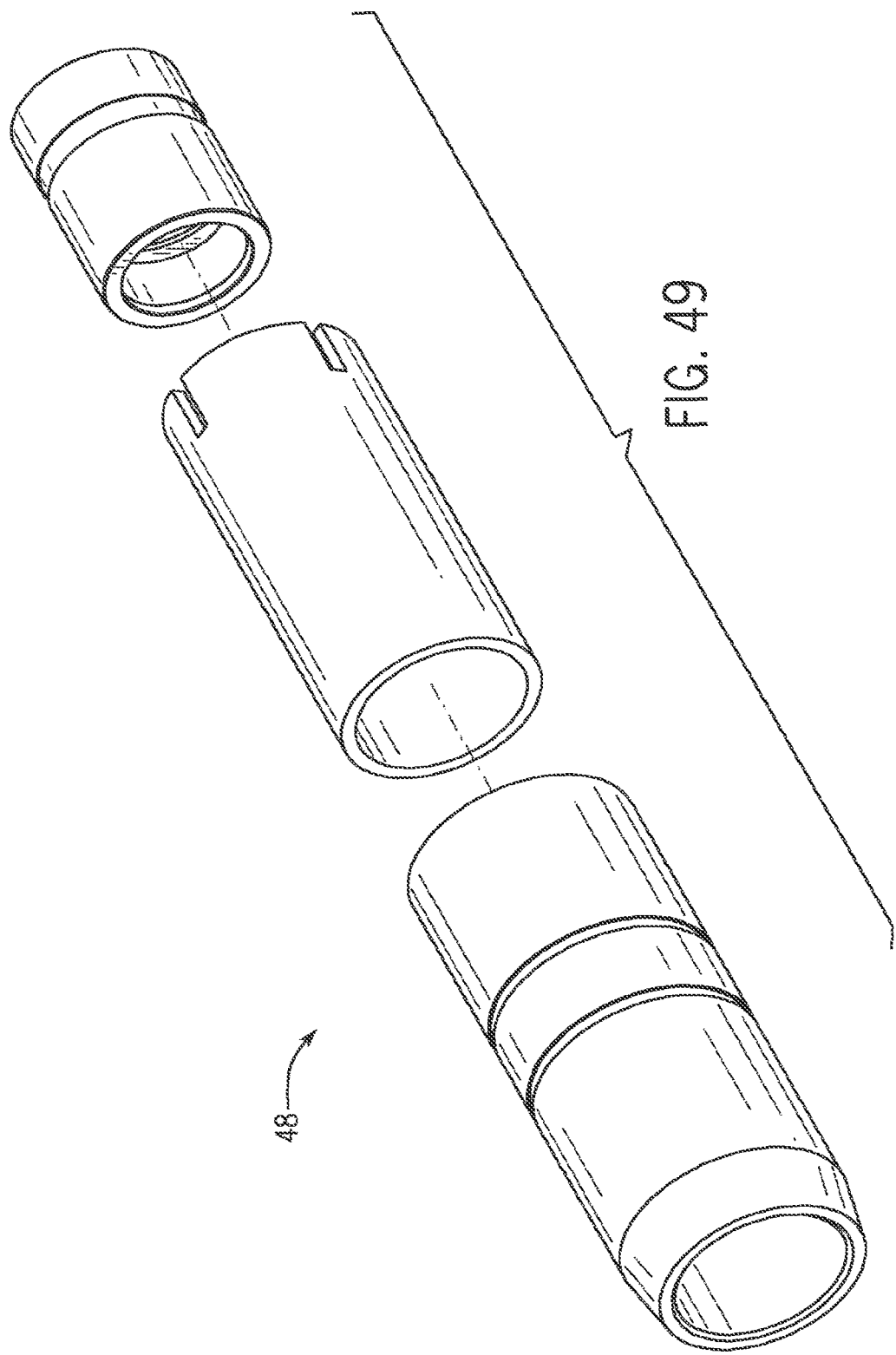

CONTACT TIP AND RECEIVING ASSEMBLY OF A WELDING TORCH

CROSS REFERENCE TO RELATED APPLICATION

This application is a continuation of, and claims priority to, co-pending U.S. Non-Provisional patent application Ser. No. 15/253,414, entitled "Contact Tip and Receiving Assembly of a Welding Torch," filed Aug. 31, 2016, which claims priority to, and the benefit of, U.S. Provisional Patent Application No. 62/220,732, entitled "Contact Tip and Receiving Assembly of a Welding Torch," having a filing date of Sep. 18, 2015, all of which are incorporated herein by reference in their entirety.

BACKGROUND

The present disclosure relates generally to welding systems and, more particularly, to securement of contact tips in welding torches of welding systems.

Welding is a process that has increasingly become ubiquitous in various industries and applications. Additionally, as welding has increased in general, automated welding processes are also becoming increasingly popular. With increasing automation in the field of welding, simple designs to meet automation maintenance goals are ever more valuable. For example, automation complexity may decrease as maintenance complexity of the welding systems also decreases.

Therefore, it may be advantageous to provide a mechanism that simplifies replacement and securement of components within welding systems that are frequently replaced. The present subject matter provides a mechanism for replacement and securement of contact tips within a welding system without the use of tools.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a method to secure a contact tip in a welding system may include applying an axial force on the contact tip toward a receiving assembly of a welding torch to establish a partially secure coupling of the contact tip to the receiving assembly. Additionally, the method may include securing a welding nozzle to the receiving assembly to establish a fully secure coupling of the contact tip to the receiving assembly.

In another embodiment, a welding torch system may include a receiving assembly that receives a contact tip and a welding nozzle. Additionally, the welding torch system may include a locking element that retains the contact tip in a partially secure position. Further, the welding nozzle may couple to the receiving assembly to retain the contact tip in a fully secure position.

In another embodiment, a torch system may include a contact tip that mounts without tools within a receiving assembly mounted on a welding torch. Additionally, the contact tip transitions between a fully secured position and a partially secured position within the receiving assembly. The contact tip may include an elongated hollow body made from an electrically conductive material. Further, the elongated hollow body interacts with a locking element of the receiving assembly.

In another embodiment, a receiving assembly includes an inner bore that receives a contact tip. Additionally, the receiving assembly includes a locking element that interacts with the contact tip to maintain the contact tip in a partially secure position. The receiving assembly also includes a first coupling interface that couples to a neck of a welding torch, and a second coupling interface that couples to a welding nozzle to maintain the contact tip in a fully secure position.

In another embodiment, a contact tip receiving assembly includes an inner bore configured to receive a contact tip. The inner bore includes at least one cooling channel disposed along an axial length of the inner bore and a contact tip securement mechanism that secures the contact tip within the receiving assembly. Additionally, the contact tip receiving assembly includes at least one gas-through port that receives shielding gas from the at least one cooling channel. Further, the at least one gas-through port directs the shielding gas radially away from the inner bore. Furthermore, the at least one cooling channel provides a path for the shielding gas to flow in direct contact with at least a portion of the contact tip disposed within the inner bore.

DRAWINGS

These and other features, aspects, and advantages of the present disclosure will become better understood when the following detailed description is read with reference to the accompanying drawings in which like characters represent like parts throughout the drawings, wherein:

FIG. 3 is an exploded view of a portion of the welding torch of FIG. 2, in accordance with an embodiment;

FIG. 4 is a further exploded view of the portion of the welding torch of FIG. 3, in accordance with an embodiment;

FIG. 49 is an exploded view of a design for various components of the welding nozzle of FIG. 38, in accordance with an embodiment.

DETAILED DESCRIPTION

One or more embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
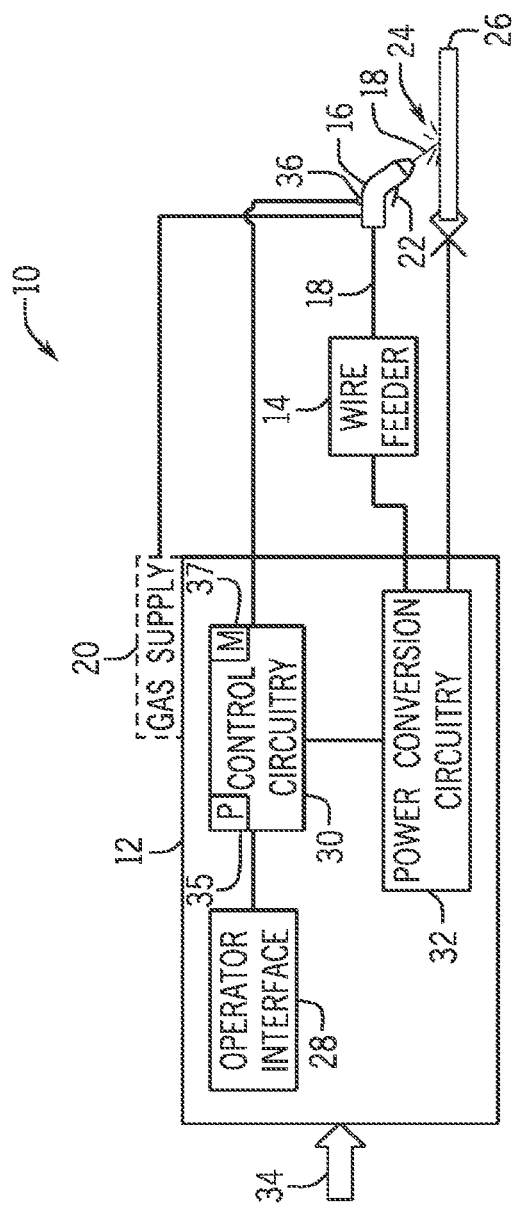
FIG. 1 is an embodiment of a metal inert gas (MIG) welding system with a power source and a wire feeder, in accordance with an embodiment.

Turning now to the drawings, and referring first to FIG. 1, a welding system 10 is illustrated as including a power source 12 coupled to a wire feeder 14. In the illustrated embodiment, the power source 12 is separate from the wire feeder 14, such that the wire feeder 14 may be positioned at some distance from the power source 12 near a welding location. However, it should be understood that the wire feeder 14, in some implementations, may be integral with the power source 12. The power source 12 may supply weld power to a torch 16 through the wire feeder 14, or the power source 12 may supply weld power directly to the torch 16. The wire feeder 14 supplies a wire electrode 18 (e.g., solid wire, cored wire, coated wire) to the torch 16. A gas supply 20, which may be integral with or separate from the power source 12, supplies a gas (e.g., $CO_2$, argon) to the torch 16. An operator may engage a trigger 22 of the torch 16 to initiate an arc 24 between the electrode 18 and a work piece 26. In some embodiments, the welding system 10 may be triggered by an automation interface including, but not limited to, a programmable logic controller (PLC) or robot controller. The welding system 10 is designed to provide welding wire (e.g., electrode 18), weld power, and shielding gas to the welding torch 16. As will be appreciated by those skilled in the art, the welding torch 16 may be of many different types, and may facilitate use of various combinations of electrodes 18 and gases.

The welding system 10 may receive data settings from the operator via an operator interface 28 provided on the power source 12. The operator interface 28 may be incorporated into a faceplate of the power source 12, and may allow for selection of settings such as the weld process (e.g., stick, TIG, MIG), the type of electrode 18 to be used, voltage and current settings, transfer mode (e.g., short circuit, pulse, spray, pulse), and so forth. In particular, the welding system 10 allows for MIG welding (e.g., pulsed MIG welding) with electrodes 18 (e.g., welding wires) of various materials, such as steel or aluminum, to be channeled through the torch 16. The weld settings are communicated to control circuitry 30 within the power source 12.

The control circuitry 30 operates to control generation of welding power output that is applied to the electrode 18 by power conversion circuitry 32 for carrying out the desired welding operation. In some embodiments, the control circuitry 30 may be adapted to regulate a pulsed MIG welding regime that may have aspects of short circuit transfer and/or of spray transfer of molten metal from the welding wire to a molten weld pool of a progressing weld. Such transfer modes may be controlled during operation by adjusting operating parameters of current and voltage pulses for arcs 24 developed between the electrode 18 and the work piece 26.

The control circuitry 30 is coupled to the power conversion circuitry 32, which supplies the weld power (e.g., pulsed waveform) that is applied to the electrode 18 at the torch 16. The power conversion circuitry 32 is coupled to a source of electrical power as indicated by arrow 34. The power applied to the power conversion circuitry 32 may originate in the power grid, although other sources of power may also be used, such as power generated by an engine-driven generator, batteries, fuel cells or other alternative sources. Components of the power conversion circuitry 32 may include choppers, boost converters, buck converters, inverters, and so forth.

The control circuitry 30 controls the current and/or the voltage of the weld power supplied to the torch 16. The control circuitry 30 may monitor the current and/or voltage of the arc 24 based at least in part on one or more sensors 36 within the wire feeder 14 or torch 16. In some embodiments, a processor 35 of the control circuitry 30 determines and/or controls the arc length or electrode extension based at least in part on feedback from the sensors 36. The arc length is defined herein as the length of the arc between the electrode 18 and the work piece 26. The processor 35 determines and/or controls the arc length or electrode extension utilizing data (e.g., algorithms, instructions, operating points) stored in a memory 37. The data stored in the memory 37 may be received via the operator interface 28, a network connection, or preloaded prior to assembly of the control circuitry 30. Operation of the power source 12 may be controlled in one or more modes, such as a constant voltage (CV) regulation mode in which the control circuitry 30 controls the weld voltage to be substantially constant while varying the weld current during a welding operation. That is, the weld current may be based at least in part on the weld voltage. Additionally, or in the alternative, the power source 12 may be controlled in a current control mode in which the weld current is controlled independent of the weld voltage. In some embodiments, the power source 12 is controlled to operate in a constant current (CC) mode where the control circuitry 30 controls the weld current to be substantially constant while varying the weld voltage during a welding operation.

Figure 2:
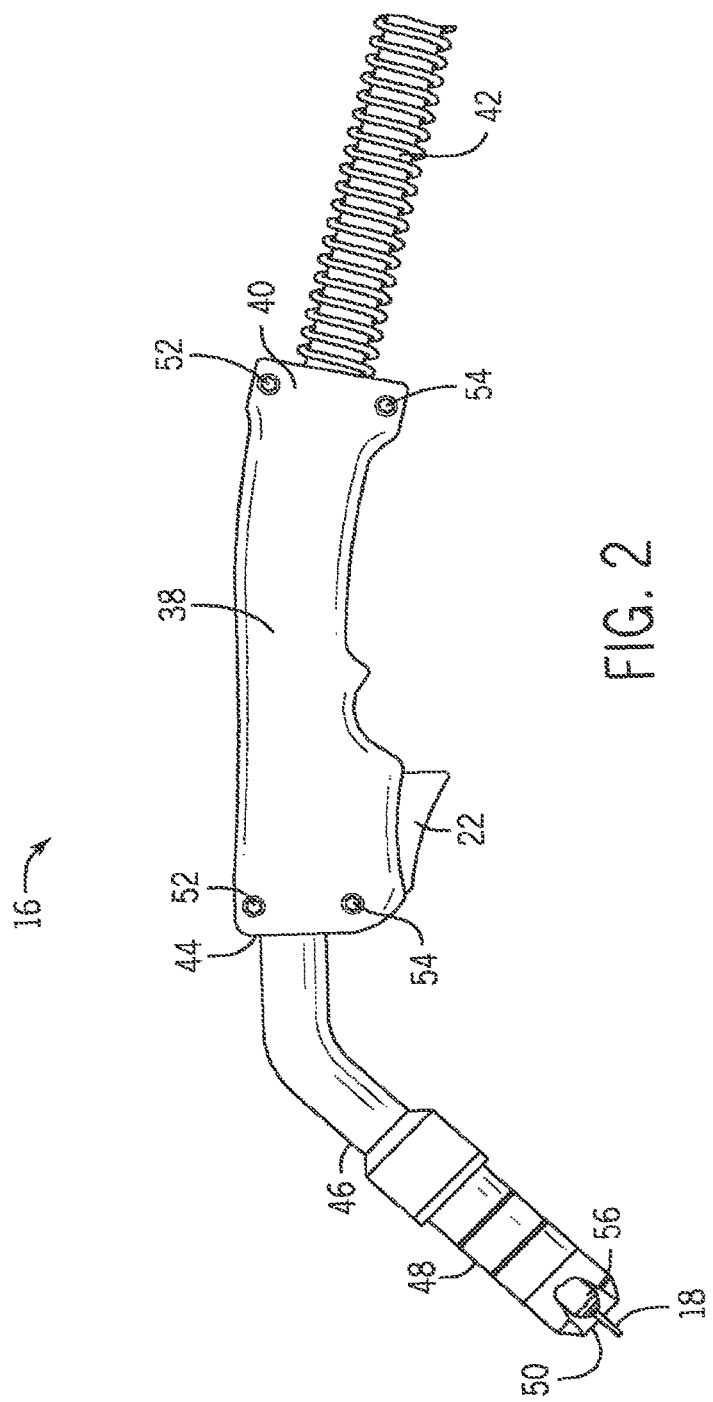
FIG. 2 is a side view of an embodiment of a welding torch of the MIG welding system of FIG. 1, in accordance with an embodiment.

FIG. 2 illustrates an embodiment of the torch 16 of FIG. 1. As discussed in relation to FIG. 1, the torch 16 includes the trigger 22 for initiating a weld and supplying the electrode 18 to the weld. Specifically, the trigger 22 is disposed on a handle 38. A welding operator holds the handle 38 when performing a weld. At a first end 40, the handle 38 is coupled to a cable 42 where welding consumables (e.g., the electrode, the shielding gas, and so forth) are supplied to the weld. Welding consumables generally travel through the handle 38 and exit at a second end 44, which is disposed on the handle 38 at an end opposite from the first end 40.

The torch 16 includes a neck 46 extending out of the second end 44 of the handle 38. As such, the neck 46 is coupled between the handle 38 and a welding nozzle 48. As should be noted, when the trigger 22 is pressed or actuated, welding wire (e.g., electrode 18) travels through the cable 42, the handle 38, the neck 46, and the welding nozzle 48, so that the welding wire extends out of an end 50 (i.e., torch tip) of the welding nozzle 48. Further, as illustrated in FIG. 2, the handle 38 is secured to the neck 46 via fasteners 52 and 54, and to the cable 42 via fasteners 52 and 54. The welding nozzle 48 is illustrated with a portion of the welding nozzle 48 removed to show the electrode 18 extending out of a contact tip 56 that is disposed within the welding nozzle 48. FIGS. 38-49 illustrate various views of a design for the welding nozzle 48 described herein.

FIG. 3 is an exploded view of a portion of the welding torch 16. Included in this illustration is a receiving assembly 58. The receiving assembly 58 receives the contact tip 56 during replacement of the contact tip 56, facilitates mechanical coupling to the welding torch 16 for the contact tip 56, and facilitates electrical coupling to the power source 12 for the contact tip 56, as discussed in detail below. Additionally, the welding nozzle 48 couples to the welding torch 16 at a coupling interface 60 of the receiving assembly 58. The coupling interface 60 may include threads corresponding to threads on an interior of the welding nozzle 48. The threads of the coupling interface 60 may facilitate securement of the welding nozzle 48 to the welding torch 16 and around the receiving assembly 58.

Furthermore, the receiving assembly 58 may include gas-through ports 62 to facilitate movement of shielding gas to a welding site. The receiving assembly 58 may also include a retention device 64. With the welding nozzle 48 uncoupled from the receiving assembly 58, application of an axial force to the contact tip 56 in an axial direction 66 may urge the contact tip 56 into the receiving assembly 58. Upon insertion, the retention device 64 may interact with a retention groove 68 of the contact tip 56 to provide a partially secure coupling of the contact tip 56 to the welding torch 16. It may be appreciated that the retention groove 68 is depicted as substantially constant around an entire circumference of the contact tip 56. Accordingly, the contact tip 56 may be inserted into the receiving assembly 58 with any angular orientation (e.g., rotated at any angle about a central axis of the contact tip 56 and the receiving assembly 58, for example, corresponding to the axial direction 66). FIGS. 11-19 illustrate various views of a design for the contact tip 56 having the substantially constant retention groove 68 around the entire circumference of the contact tip 56, as described herein.

However, in other contemplated embodiments, the retention groove 68 may extend only partially around the circumference of the contact tip 56 to receive a portion of the retention device 64 when the contact tip 56 is in a specific orientation (e.g., rotated at a specific angle or range of angles about a central axis of the contact tip 56 and the receiving assembly 58, for example, corresponding to the axial direction 66) within the receiving assembly 58. Further, in certain embodiments, the retention groove 68 may be replaced by one or more discrete recesses 67 circumferentially surrounding the contact tip 56 corresponding to a shape of the retention device 64 such that the contact tip 56 may be positioned within the receiving assembly 58 in a number of discrete orientations (e.g., rotated at any one of a number of discrete angles about a central axis of the contact tip 56 and the receiving assembly 58, for example, corresponding to the axial direction 66). FIGS. 20-28 illustrate various views of a design for the contact tip 56 having the one or more discrete recesses 67 disposed around the entire circumference of the contact tip 56, as described herein. Additionally, in certain embodiments, the contact tip 56 may not include the retention groove 68, and the retention device 64 may interact directly on a body of the contact tip 56 (e.g., by applying a radially inward force). FIGS. 29-37 illustrate various views of a design for the contact tip 56 without the retention groove 68 around the entire circumference of the contact tip 56, as described herein. Furthermore, it may be appreciated that, in certain embodiments, the retention device 64 may include any retention device capable of interacting with the retention groove 68 or the body of the contact tip 56 to partially retain the contact tip 56. For example, the retention device 64 may include a ball that partially sits within the retention groove 68 (or within one of the discrete recesses 67) while the contact tip 56 is positioned within the receiving assembly 58. Similarly, the ball may sit against the body of the contact tip 56 while the contact tip 56 is positioned within the receiving assembly 58. Alternatively, in certain embodiments, the retention device 64 may include a pin with rounded ends that interacts in a similar manner with the contact tip 56 as the ball described above. Any other devices capable of interacting with the contact tip 56 to partially retain the contact tip 56 are also contemplated as the retention device 64.

Similarly, when the welding nozzle 48 is removed from the receiving assembly 58, an axial force on the contact tip 56 in a direction opposite the axial direction 66 may mechanically release the contact tip 56 from the receiving assembly 58. Accordingly, after removal of the welding nozzle 48 from the welding torch 16, the contact tip 56 may be mechanically released from the receiving assembly 58 without the aid of tools. Additionally, once the contact tip 56 is removed from the receiving assembly 58 and the welding nozzle 48 is removed from the receiving assembly 58, a new contact tip 56 may be mechanically coupled, in a partially secure manner, within the receiving assembly 58.

FIG. 4 is a further exploded view of the portion of the welding torch 16 illustrated in FIG. 3. The exploded view of FIG. 4 provides additional detail into mechanics of the receiving assembly 58 that secures the contact tip 56. For example, a locking element 69 (e.g., a locking bead or ball) is illustrated. The locking element 69 interacts with the retention groove 68 in the contact tip 56. When the contact tip 56 is in a partially secured position (i.e., when the contact tip 56 is in the receiving assembly 58 and the welding nozzle 48 is removed from the receiving assembly 58), the locking element 69 is partially deposited in the retention groove 68 of the contact tip 56. While in the retention groove 68, the locking element 69 may be held in place by a retention band 70 to provide a radially inward force on the locking element 69 into the retention groove 68. The radially inward force provided by the retention band 70 on the locking element 69 may establish a partially secure coupling of the contact tip 56 to the receiving assembly 58. The partially secure coupling may indicate a state in which the contact tip 56 is affixed to the welding torch 16, but the contact tip 56 may not have enough retention force for a welding operation. Accordingly, when the contact tip 56 is partially secured within the welding torch 16, the contact tip 56 is easily removable from the welding torch 16. For example, the contact tip 56 may be toollessly removed from the welding torch 16 while the contact tip 56 is partially secured. Further, while the contact tip 56 is partially secured, a retention force provided by the retention band 70 on the locking element 69 may not be sufficient for the contact tip 56 to generate a sufficient electrical coupling with the welding torch 16 to conduct a welding operation.

With the foregoing in mind, the contact tip 56 may become fully secure when the welding nozzle 48 is coupled to the receiving assembly 58. As discussed above, the receiving assembly 58 includes the coupling interface 60. The coupling interface 60 may include male threads that interact with female threads within the welding nozzle 48 (not shown). The interaction between the coupling interface 60 and the welding nozzle 48 may provide an additional force on the locking element 69 to establish a fully secure coupling between the contact tip 56 and the receiving assembly 58. The fully secure coupling may provide a sufficient mechanical and electrical coupling between the contact tip 56 and the receiving assembly 58 to conduct a welding operation. Accordingly, the contact tip 56 maintains mechanical and electrical coupling with the receiving assembly 58 throughout the course of the welding operation.

Further, if the contact tip 56 is in a fully secure state with the welding nozzle 48 coupled to the receiving assembly 58, then removing the welding nozzle 48 will function to transition the contact tip 56 into a partially secure state. Therefore, to provide a mechanical release and electrical decoupling of the contact tip 56 from the welding torch 16, the welding nozzle 48 is first removed from the receiving assembly 58. After removing the welding nozzle 48, the contact tip 56 is removed by application of an axial force in the direction opposite the axial direction 66. As mentioned above, this entire process may be accomplished toollessly.

Additionally, the receiving assembly 58 includes a radial orifice 72 to accept the locking element 69. A combination of the radial orifice 72 and the locking element 69 may constitute the retention device 64 intended to retain the contact tip 56 within the receiving assembly 58. The radial orifice 72 may be configured to intersect with an inner bore 74 of the receiving assembly 58, which receives the contact tip 56. Additionally, the radial orifice 72 may include varying dimensions along a radial length into the receiving assembly 58. In this manner, the radial orifice 72 may accept the locking element 69, and the varying dimensions may enable the locking element 69 to move freely along an axis of the radial orifice 72. Further, the radial orifice 72 may also be shaped such that a portion of the locking element 69 extends into the inner bore 74 when the locking element 69 is positioned in a deepest portion of the radial orifice 72. At the same time, the radial orifice 72 may also be shaped in such a manner that the locking element 69 cannot extend completely into the inner bore 74.

Moreover, the receiving assembly 58 may include a retention groove 76 about a circumference of the receiving assembly 58. The retention groove 76 may be sized such that it accepts and retains the retention band 70. As illustrated, in certain embodiments, the retention band 70 is a non-continuous ring that is expandable radially to fit around the receiving assembly 58 within the retention groove 76. The receiving assembly 58 and the retention band 70 may include features that mechanically interact to prevent the retention band 70 from rotating about the circumference of the receiving assembly 58. For example, the retention band 70 may include a bend or bends along a length of the retention band 70 that correspond with wider portions in sections of the retention groove 76. The bends of the retention band 70 and the corresponding sections of the retention groove 76 mechanically interact to prevent the retention band 70 from rotating circumferentially about the receiving assembly 58. In this manner, the retention band 70 may remain radially or axially moveable within the constraints of the retention groove 76. Accordingly, when the locking element 69 is within the radial orifice 72 and the retention band 70 is within the retention groove 76, the retention band 70 at least partially covers the locking element 69 to retain the locking element 69 within the radial orifice 72.

As the contact tip 56 is axially inserted into the inner bore 74 of the receiving assembly 58, the contact tip 56 may come into contact with a portion of the locking element 69 that protrudes (e.g., radially inward) from the radial orifice 72 into the inner bore 74. The contact tip 56 may include an angled surface on an end 78 of the contact tip 56 that urges the locking element 69 to push radially outward against the retention band 70 and away from the contact tip 56. At the same time, the contact tip 56 may be urged against by a resistive force acting on the locking element 69 from the retention band 70. During insertion of the contact tip 56 into the inner bore 74, the retention band 70 may extend radially outward until the locking element 69 reaches the retention groove 68 of the contact tip 56. Upon reaching the retention groove 68, the locking element 69 is forced back toward the contact tip 56 by the resistive force of the retention band 70. At this point, the contact tip 56 may be considered mounted within the welding torch 16 in a partially secure manner. Further, the locking element 69 and the retention groove 68 may align in such a manner that the locking element 69 reaches the retention groove 68 upon the contact tip 56 reaching a fully inserted position within the inner bore 74. While less force may be exerted on the locking element 69 by the retention band 70 when the locking element 69 is deposited within the retention groove 68, the retention band 70 may maintain some force on the locking element 69 to maintain the locking element 69 within the retention groove 68 and to hold the contact tip 56 against the wall of the inner bore 74 opposite the locking element 69. Furthermore, the locking element 69 may rest in contact with a bottom surface of the retention groove 68, side surfaces of the retention groove 68, or all three of the surfaces of the retention groove 68.

Additionally, in certain embodiments, the end 78 of the contact tip 56 may have a diameter D1 within a range between approximately 0.265 inches and approximately 0.275 inches. The diameter D1 may be approximately 98 percent of the size of a diameter D2 of the inner bore 74. In this manner, the inner bore 74 may receive the contact tip 56 with minimal resistance while providing an appropriate fit to enable partial securement of the contact tip 56 within the receiving assembly 58.

In the partially secure state described above, axial movement of the contact tip 56 within the receiving assembly 58 may be hindered, but not prevented. Accordingly, the contact tip 56 may still be removed via axial force applied in a direction away from the receiving assembly 58. Force provided without the use of tools may be sufficient for removal of the contact tip 56 from the receiving assembly 58. Further, electrical coupling of the contact tip 56 to the welding torch 16 may be established in the partially secure state, but the electrical coupling may not be sufficient for current transfer during normal welding operations.

Figure 5:
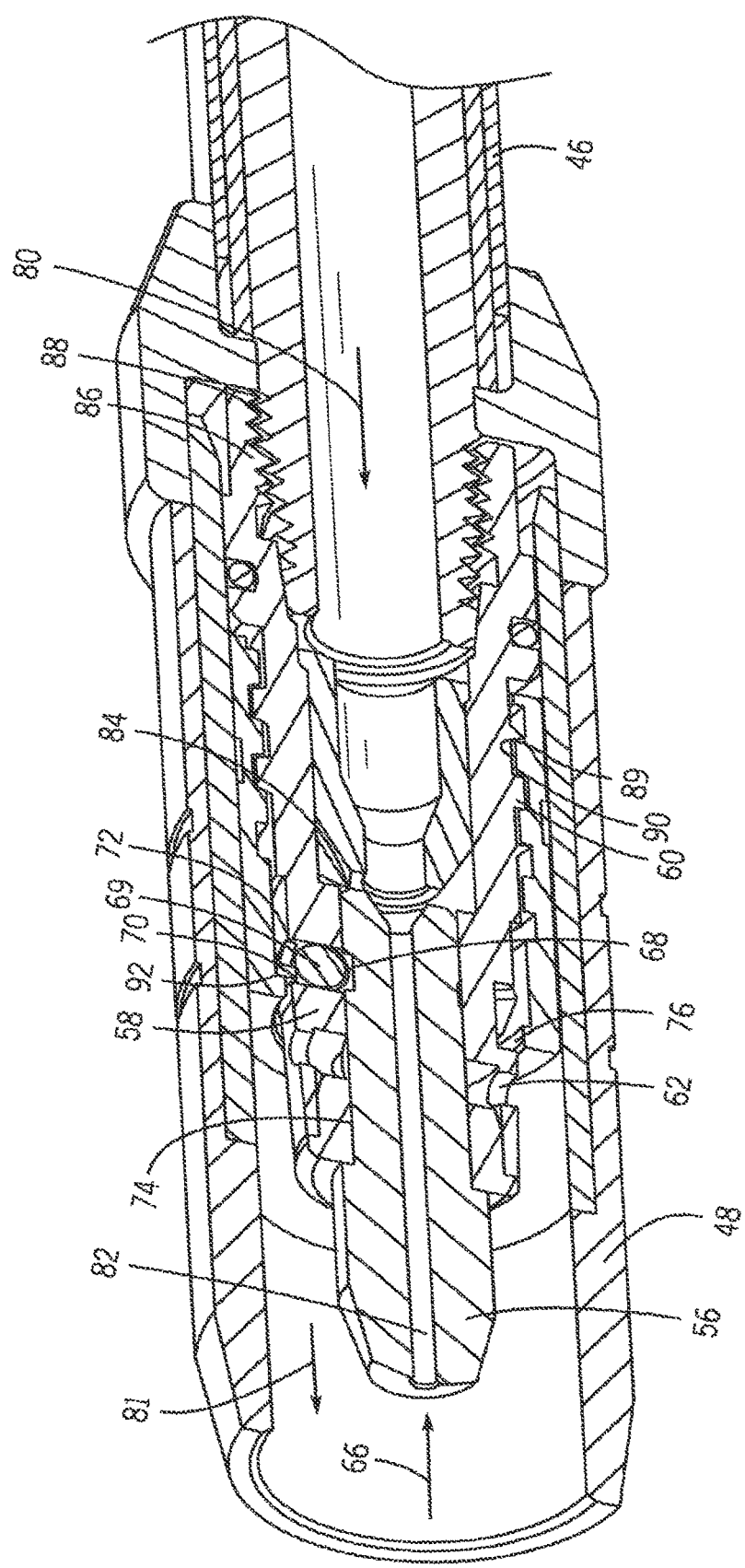
FIG. 5 is a cross-sectional illustration of the portion of the welding torch of FIG. 3, in accordance with an embodiment.

FIG. 5 is a cross-sectional illustration of a portion of the welding torch 16 when the contact tip 56 is in a fully secure position. As illustrated, shielding gas, wire (i.e., the electrode 18), and current flow through the welding torch 16 in a direction 80. The shielding gas flows from in inner area of the neck 46 toward the welding nozzle 48 to shield the welding location from a surrounding atmosphere that may cause imperfections during a welding operation. The shielding gas flows through gas-through ports 62 of the receiving assembly 58 upon exiting the neck 46 to ultimately exit out of the welding nozzle 48 at the welding location. The receiving assembly 58 may include pathways to transfer the shielding gas from the neck 46 to the gas-through ports 62, as described in detail in the discussion of FIGS. 8 and 9. Further, the receiving assembly 58 may operate as a shielding gas diffuser. Accordingly, the receiving assembly 58 may direct the shielding gas in an axial direction 81 along an external portion of the contact tip 56 while the contact tip 56 is in the fully secure position. Such direction of the shielding gas may aid in cooling the contact tip 56 during a welding operation.

Additionally, the wire (i.e., the electrode 18) is fed in the direction 80 toward the welding location. The wire travels through the receiving assembly 58 and into the contact tip 56. The contact tip 56 includes an elongated body with a hollow interior 82. Further, the hollow interior 82 receives the wire at an interface 84 with the receiving assembly 58 and facilitates transmission of the wire in the direction 80 toward the welding location. The interface 84 may include a space between a base (see, e.g., base portion 116 illustrated in FIG. 9) of the contact tip 56 and the receiving assembly 58. That is, the base of the contact tip 56 may maintain a small degree of separation from the receiving assembly 58 at the interface 84.

FIG. 5 also provides an illustration of a path in which the current may flow. For example, a coupling interface 86 couples to the neck 46 of the welding torch 16 to the receiving assembly 58 via threaded regions 88 of the neck 46 and the coupling interface 86. Interaction between the threaded regions 88 enables the flow of current from the neck 46 to the receiving assembly 58. Upon entering the coupling interface 86, the current travels to the inner bore 74 of the receiving assembly 58. At the inner bore 74, the current may have multiple transfer paths to the contact tip 56. For example, the locking element 69 may be made from a conductive material (e.g., steel) enabling the flow of current through the locking element 69 into the contact tip 56, which is also made from a conductive material. Because, in the fully secure position, the locking element 69 is in contact with both the receiving assembly 58 and the contact tip 56, the flow of current may travel from the receiving assembly 58, through the locking element 69, and to the contact tip 56 to produce the arc 24. Additionally, the contact tip 56 may receive the flow of current via a wall of the inner bore 74. As the flow of current enters the inner bore 74, the inner bore 74 is in contact with the contact tip 56. Therefore, the flow of current may travel from the inner bore 74 directly to any portion of the contact tip 56 that is in contact with the inner bore 74. As such, any one path described above, or any combination of the paths, may provide sufficient contact for adequate current transfer.

It may be appreciated that the coupling interface 86 may also enable retrofitting an existing welding torch with the receiving assembly 58, the contact tip 56, and the welding nozzle 48 disclosed herein. For example, the welding torch 16 may be sold with a traditional contact tip securement mechanism coupled to the neck 46 of the welding torch 16. An operator of the welding torch 16 may replace the traditional contact tip securement mechanism with the receiving assembly 58 described in the present disclosure. Accordingly, the operator may purchase the receiving assembly 58, the welding nozzle 48, and the contact tip 56 separately from the welding torch 16.

FIG. 5 also illustrates a mechanism for transitioning the contact tip 56 between the fully secure position and the partially secure position. As illustrated, the welding nozzle 48 is coupled to the receiving assembly 58 establishing the fully secure position. Further, the welding nozzle 48 is coupled to the receiving assembly 58 via the coupling interface 60 of the receiving assembly 58 (e.g., threads 89) and threads 90 of the welding nozzle 48. In the fully secure position, the locking element 69 is urged into the retention groove 68 of the contact tip 56 by an internal surface 92 of the welding nozzle 48 applying a linear force in the axial direction 66 on the retention band 70. Movement in the axial direction 66 may urge the retention band 70 toward a center of the radial orifice 72 and the locking element 69. Accordingly, the retention band 70 may ride up an outer surface of the locking element 69 as the retention band 70 approaches the center of the radial orifice 72. In this manner, the retention band 70 applies continually greater pressure on the locking element 69 as the welding nozzle 48 is threaded onto the receiving assembly 58. Therefore, the retention band 70 applies additional force on the locking element 69 into the retention groove 68 in addition to the force already provided when the welding nozzle 48 is not coupled to the receiving assembly 58. Additionally, the additional force on the locking element 69 may provide greater contact between the contact tip 56 and the inner bore 74 for enhanced mechanical and electrical coupling.

To transition the contact tip 56 to the partially secure position, the welding nozzle 48 may be unscrewed from the receiving assembly 58 to remove the welding nozzle 48. Once the welding nozzle 48 is removed from the receiving assembly 58, the force applied by the welding nozzle 48 onto the retention band 70 is also removed. Removing the force on the retention band 70 transitions the contact tip 56 to the partially secure position. As discussed above, the contact tip 56 is removable without the use of tools while in the partially secure position.

Figure 6:
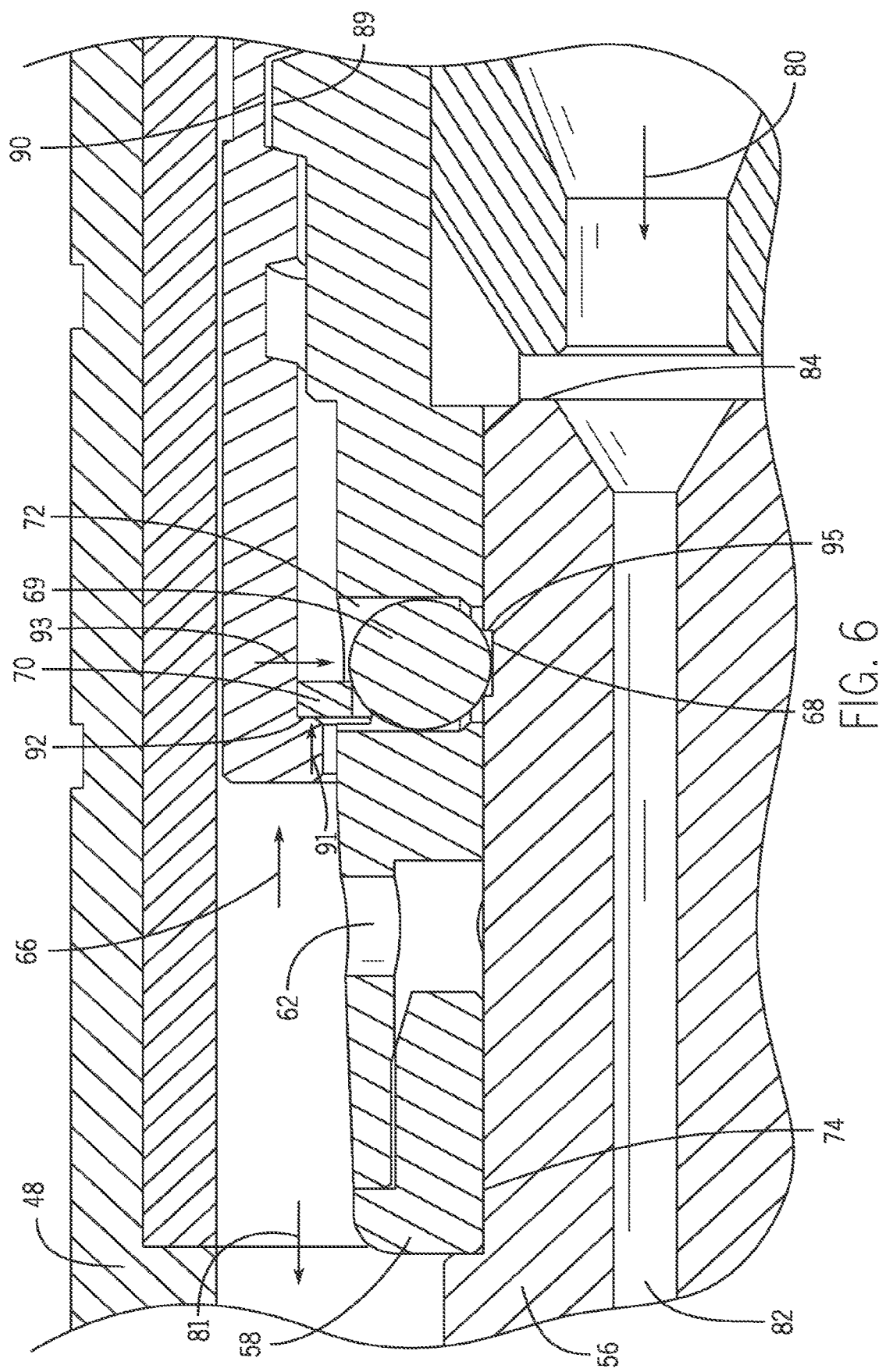
FIG. 6 is a cross-sectional illustration of a magnified portion of the welding torch of FIG. 5, in accordance with an embodiment.

FIG. 6 is a cross-sectional illustration of a magnified portion of the welding torch 16 illustrated in FIG. 5. The locking element 69 is urged into the retention groove 68 of the contact tip 56 by the internal surface 92 of the welding nozzle 48 applying a linear force in the axial direction 66 on the retention band 70. Movement in the axial direction 66 may urge the retention band 70 toward a center of the radial orifice 72 and the locking element 69. Accordingly, the retention band 70 may ride up an outer surface of the locking element 69 as the retention band 70 approaches the center of the radial orifice 72 by moving in a direction 91. In this manner, the retention band 70 applies continually greater radially inward force on the locking element 69 as the welding nozzle 48 is threaded onto the receiving assembly 58. Consequently, the locking element 69 may move in a direction 93 into the retention groove 68 as the welding nozzle 48 is secured to the welding torch 16. Therefore, the retention band 70 applies additional radially inward force on the locking element 69 into the retention groove 68 in addition to a radially inward force already provided when the welding nozzle 48 is not coupled to the receiving assembly 58. Additionally, the added radially inward force on the locking element 69 may provide greater contact between the contact tip 56 and the inner bore 74 for enhanced mechanical and electrical coupling.

Further, FIG. 6 provides a detailed illustration of four components that provide the fully secure position of the contact tip 56. Namely, FIG. 6 illustrates the receiving assembly 58, which receives the contact tip 56; the locking element 69, which is seated within the radial orifice 72 of the receiving assembly 58; the retention band 70, which provides a radially inward force on the locking element 69, and the welding nozzle 48, which includes the internal surface 92 that urges the retention band 70 toward the center of the radial orifice 72. As the welding nozzle 48 is secured to the receiving assembly 58 via the threads 89 and 90, the internal surface 92 provides the linear force in the axial direction 66 on the retention band 70. The retention band 70 moves toward the center of the radial orifice 72 and generates the radially inward force on the locking element 69 toward the retention groove 68. Accordingly, the locking element 69 is forced into the retention groove 68 to generate the fully secure position of the contact tip 56 within the receiving assembly 58.

When the welding nozzle 48 is not secured to the receiving assembly 58, the retention band 70 may supply sufficient radially inward force on the locking element 69 to maintain the locking element 69 within the radial orifice 72 and partially secured in the retention groove 68. However, without the welding nozzle 48 secured to the receiving assembly 58, a force provided toollessly on the contact tip 56 in the axial direction 81 may be sufficient to remove the contact tip 56 from the receiving assembly 58. For example, a lip 95 of the retention groove 68 may provide a radially outward force on the locking element 69 when the force is provided on the contact tip 56 in the axial direction 81. The radially outward force may elastically deform the retention band 70 sufficiently for the locking element 69 to exit the retention groove 68, as the contact tip 56 is removed from the receiving assembly 58 in the axial direction 81.

Figure 7:
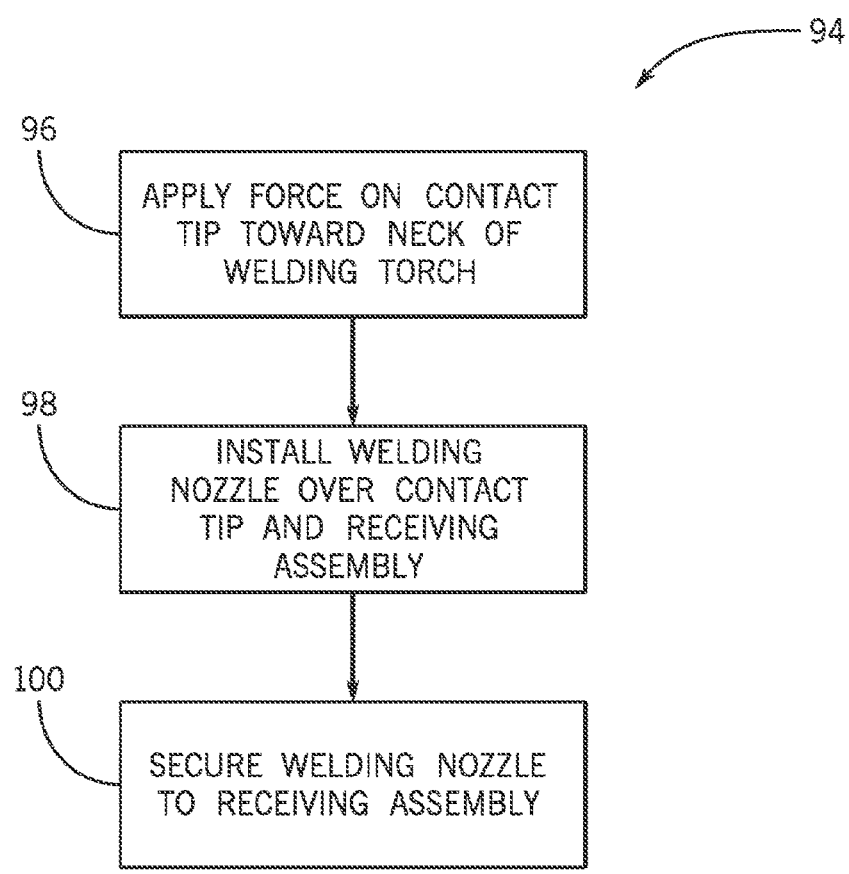
FIG. 7 is a flow diagram of a method to install a contact tip within the welding torch in a fully secure position, in accordance with an embodiment.

FIG. 7 is a flow diagram of a method 94 for installing the contact tip 56 in the fully secure position. Initially, at block 96, with the welding nozzle 48 uncoupled from the receiver assembly 58, an axial force is applied on the contact tip 56 in the axial direction 66 toward the neck 46 of the welding torch 16 and into the inner bore 74. The amount of axial force that establishes the partially secure position may be a force sufficient to overcome the radially inward force exerted by the retention band 70 on the locking element 69 toward the inner bore 74 of the receiving assembly 58. The axial force provided on the contact tip 56 in the axial direction 66 may be substantially perpendicular to the radially inward force exerted on the locking element 69. Accordingly, the contact tip 56 may be established in the partially secure position without the use of tools.

Subsequently, at block 98, the welding nozzle 48 is installed over the contact tip 56 and the receiving assembly 58. As discussed above, the welding nozzle 48 provides additional radially inward force on the locking element 69 to aid in establishing the fully secure position of the contact tip 56. Additionally, the welding nozzle 48 may provide the additional radially inward force with the internal surface 92 interacting with the retention band 70. As the welding nozzle 48 moves further down the receiving assembly 58 in the axial direction 66, the locking element 69 experiences more radially inward force toward the retaining groove 68 of the contact tip 56.

Further, at block 100, the welding nozzle 48 is secured to the receiving assembly 58. The welding nozzle 48 may be secured to the receiving assembly 58 via the coupling interface 60 of the receiving assembly 58, which may include threads 89, and the threads 90 of the welding nozzle 48. Accordingly, the welding nozzle 48 may be threaded onto the receiving assembly 58 until the welding nozzle 48 reaches the end of the threads 89 of the coupling interface 60. At this position, the welding nozzle 48 may be secured to the welding torch 16, and the contact tip 56 may be in a fully secured position within the receiving assembly 58. Additionally, the welding nozzle 48 may be secured to the receiving assembly 58 without the use of tools. Further, the welding nozzle 48 may be secured to the receiving assembly 58 in any other suitable manner that may establish a similar force on the locking element 69 into the retention groove 68.

Figure 8:
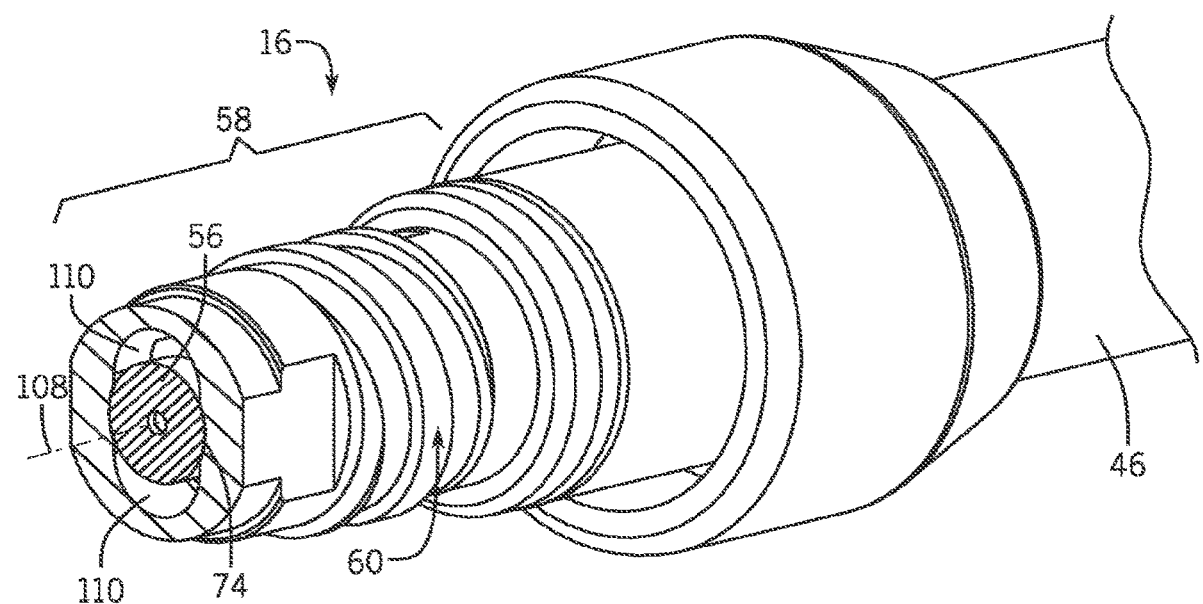
FIG. 8 is a perspective view of the welding torch of FIG. 3 with an end portion of a receiving assembly removed, in accordance with an embodiment.

FIG. 8 is a perspective view of the welding torch 16 with an end portion of the receiving assembly 58 and the contact tip 56 removed. In this manner, contact tip cooling channels 110 are illustrated surrounding the contact tip 56. The contact tip cooling channels 110 may be orthogonal to portions of the inner bore 74 of the receiving assembly 58 upon which the contact tip 56 is secured, as described herein.

Further, the contact tip cooling channels 110 may direct a flow of shielding gas along an axial length of the contact tip 56 within the inner bore 74 of the receiving assembly 58 (e.g., between the contact tip 56 and the receiving assembly 58 within the contact tip cooling channels 110). The flow of shielding gas along the axial length of the contact tip 56 provides a heat transfer medium for the contact tip 56 during a welding operation. Accordingly, heat generated at the contact tip 56 may be transferred to the shielding gas as the shielding gas flows along the contact tip 56 and exits the welding torch 16 toward the work piece 26. The transfer of heat to the shielding gas may result in the contact tip 56 operating at a lower temperature. Additionally, the lower temperature may decrease wear on the contact tip 56 and increase longevity of the contact tip 56.

Figure 9:
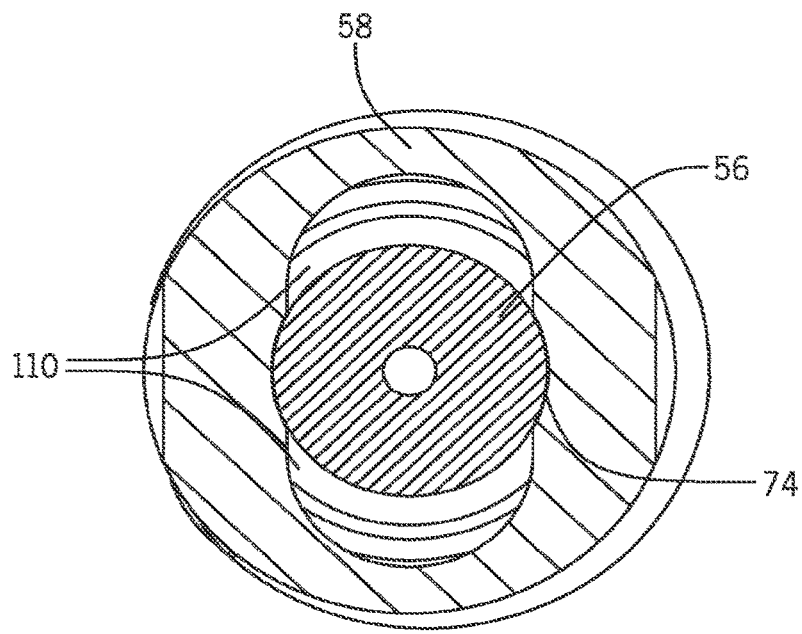
FIG. 9 is a cross-sectional illustration of the contact tip and the receiving assembly of FIG. 8, in accordance with an embodiment.

FIG. 9 is a cross-sectional illustration of the receiving assembly 58 and the contact tip 56 including the contact tip cooling channels 110. The cross-sectional illustration provides a more detailed view of the cooling channels 110 and an interaction of portions of the contact tip 56 within the receiving assembly 58. For example, the contact tip 56 may be in contact with the inner-bore 74 of the receiving assembly 58 for less than 50 percent of the surface area of a portion of the contact tip 56 disposed within the receiving assembly 58. The portions in contact with the inner-bore 74 provide an adequate surface area to secure the contact tip 56 within the receiving assembly 58. Further, the cooling channels 110, which may abut greater than 50 percent of the surface area of the contact tip 56 within the receiving assembly 58, provide adequate heat transfer between the flow of shielding gas and the contact tip 56 to reduce an operating temperature of the contact tip 56 during a welding operation.

Figure 10:
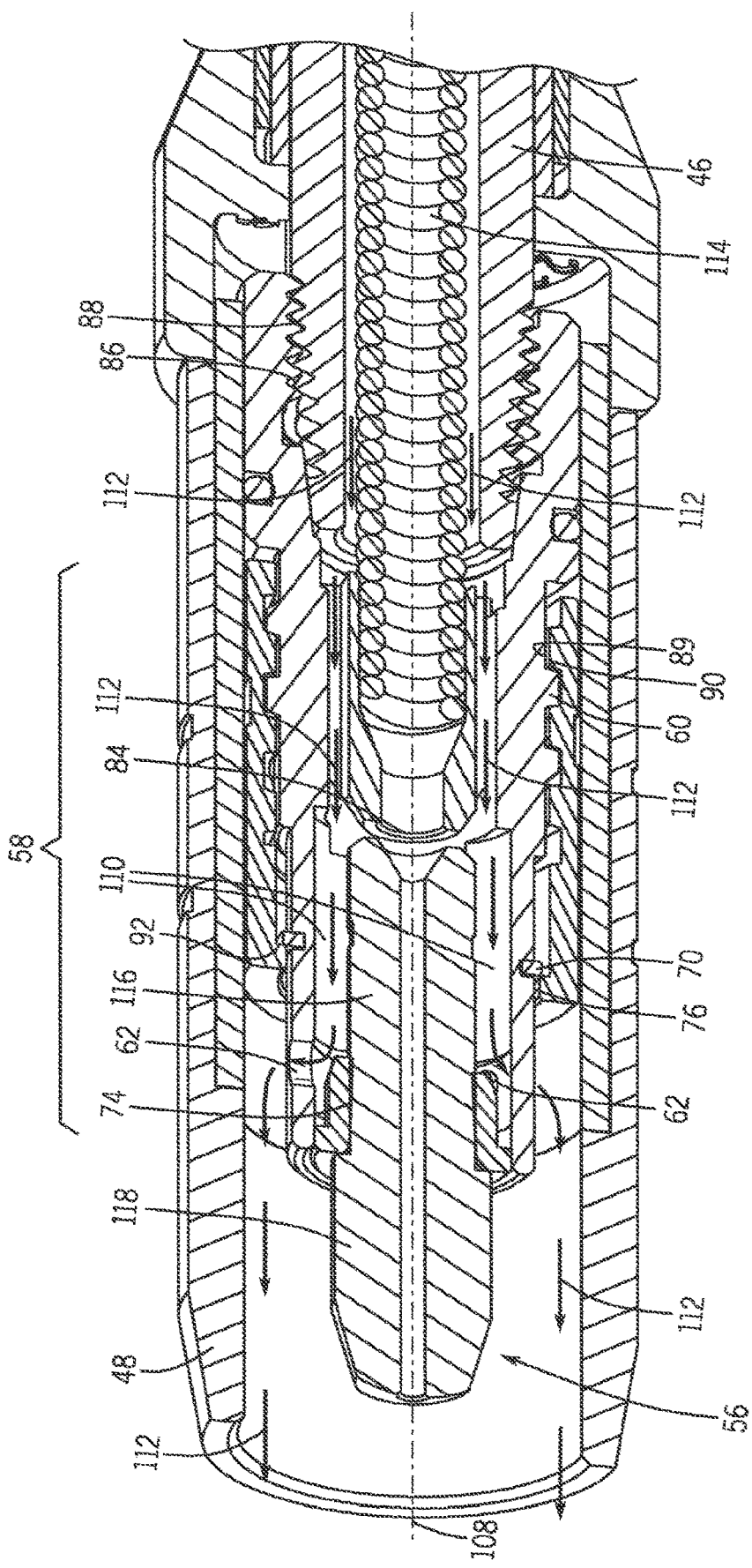
FIG. 10 is a cross-sectional illustration of a portion of the welding torch of FIG. 3, in accordance with an embodiment.
Figure 11:
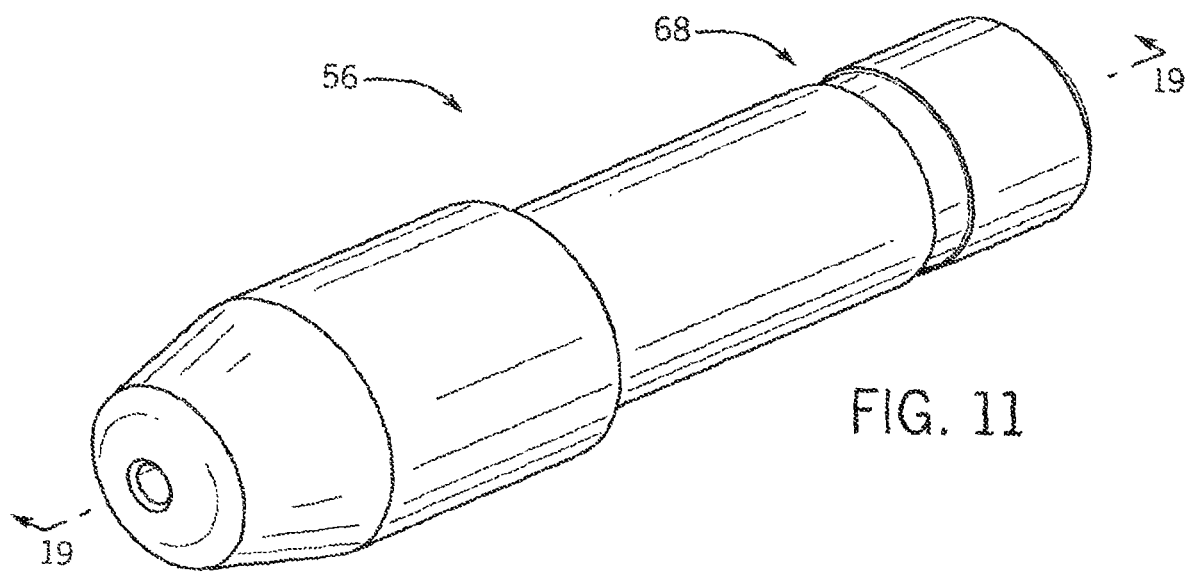
FIG. 11 is a front perspective view of a design for a contact tip having a retention groove, in accordance with an embodiment.
Figure 12:
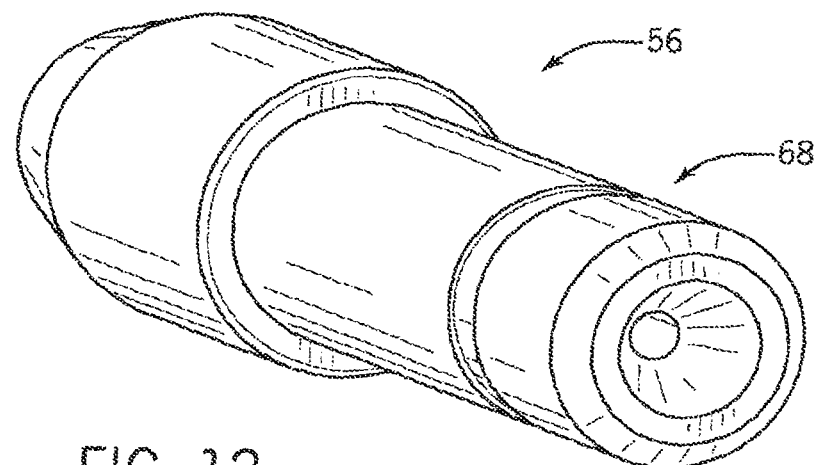
FIG. 12 is a rear perspective view of a design for the contact tip of FIG. 11, in accordance with an embodiment.
Figure 13:
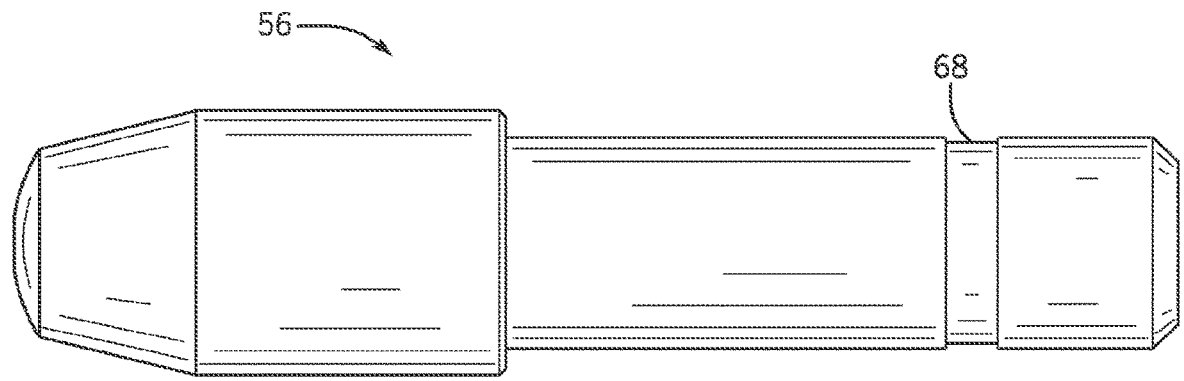
FIG. 13 is a first side view of a design for the contact tip of FIG. 11, in accordance with an embodiment.
Figure 14:
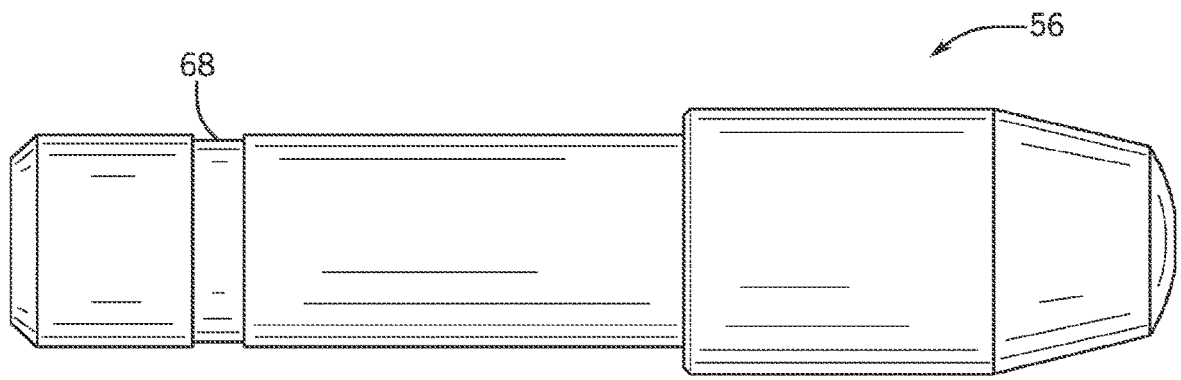
FIG. 14 is a second side view of a design for the contact tip of FIG. 11, in accordance with an embodiment.
Figure 15:
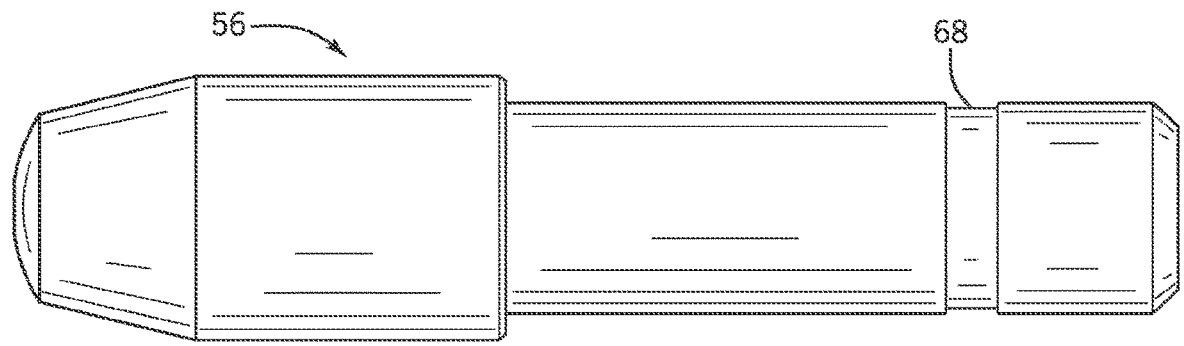
FIG. 15 is a top view of a design for the contact tip of FIG. 11, in accordance with an embodiment.
Figure 16:
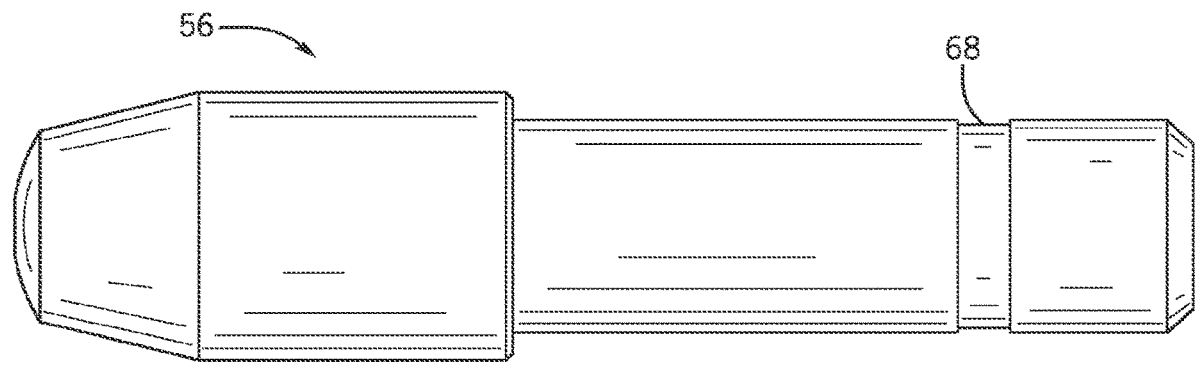
FIG. 16 is a bottom view of a design for the contact tip of FIG. 11, in accordance with an embodiment.
Figure 17:
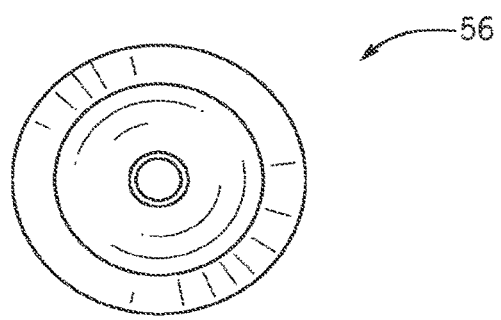
FIG. 17 is a front view of a design for the contact tip of FIG. 11, in accordance with an embodiment.
Figure 18:
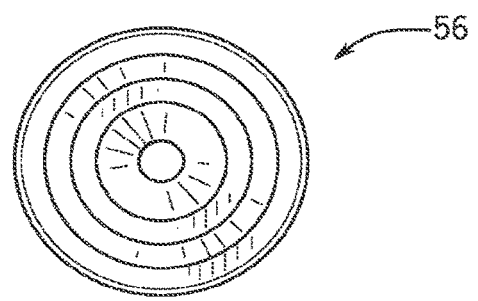
FIG. 18 is a rear view of a design for the contact tip of FIG. 11, in accordance with an embodiment.
Figure 19:
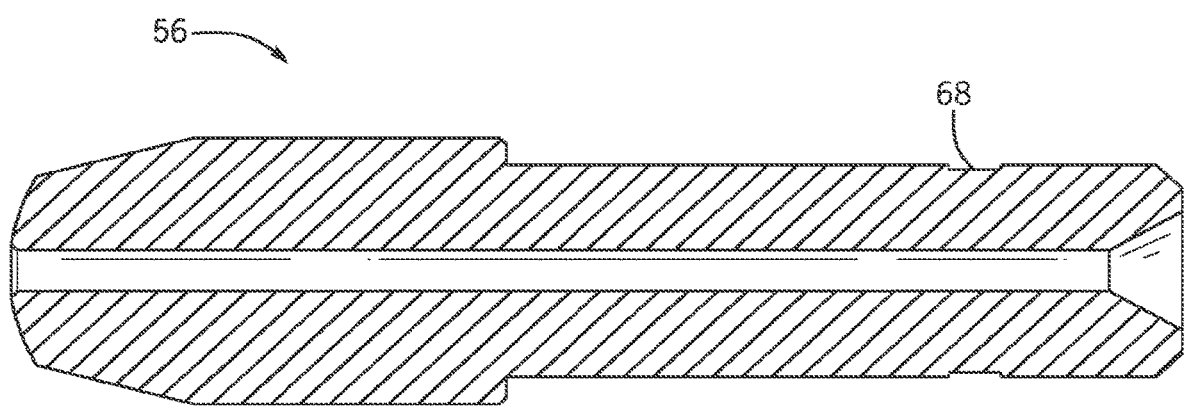
FIG. 19 is a cross-sectional cutaway view of a design for the contact tip of FIG. 11, in accordance with an embodiment.
Figure 20:
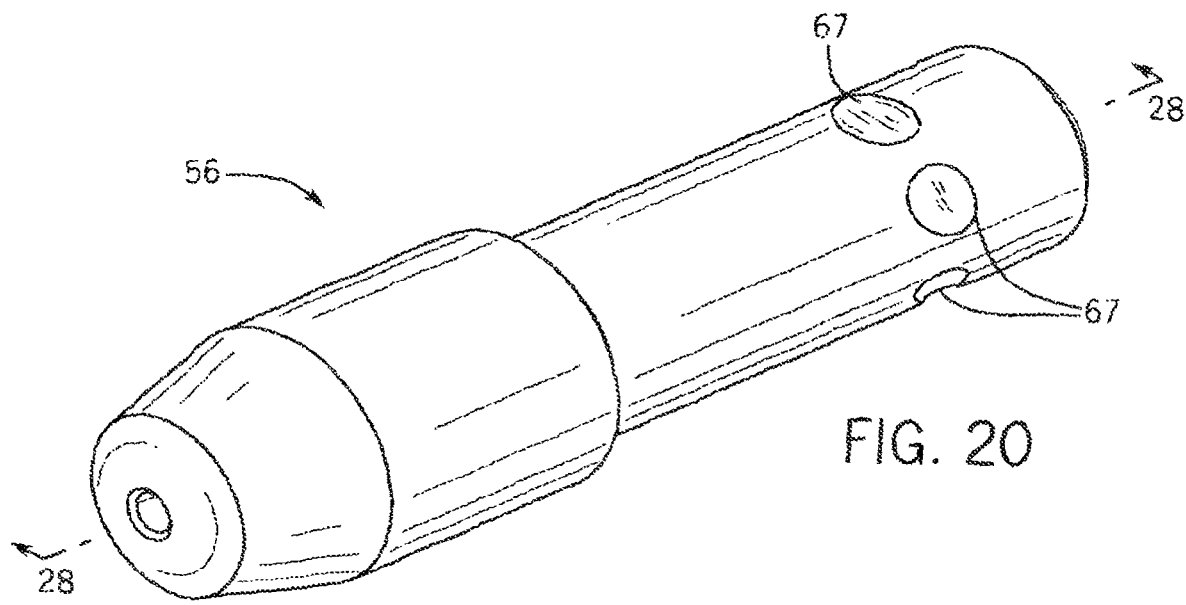
FIG. 20 is a front perspective view of a design for a contact tip having one or more discrete recesses, in accordance with an embodiment.
Figure 21:
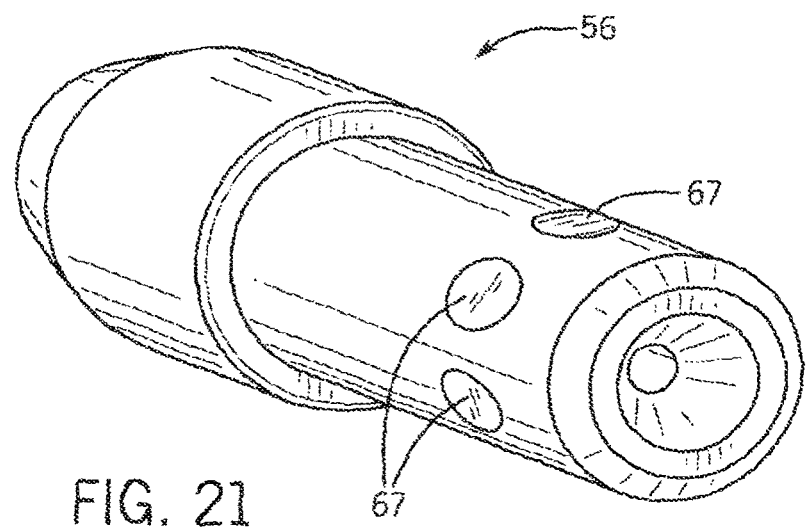
FIG. 21 is a rear perspective view of a design for the contact tip of FIG. 20, in accordance with an embodiment.
Figure 22:
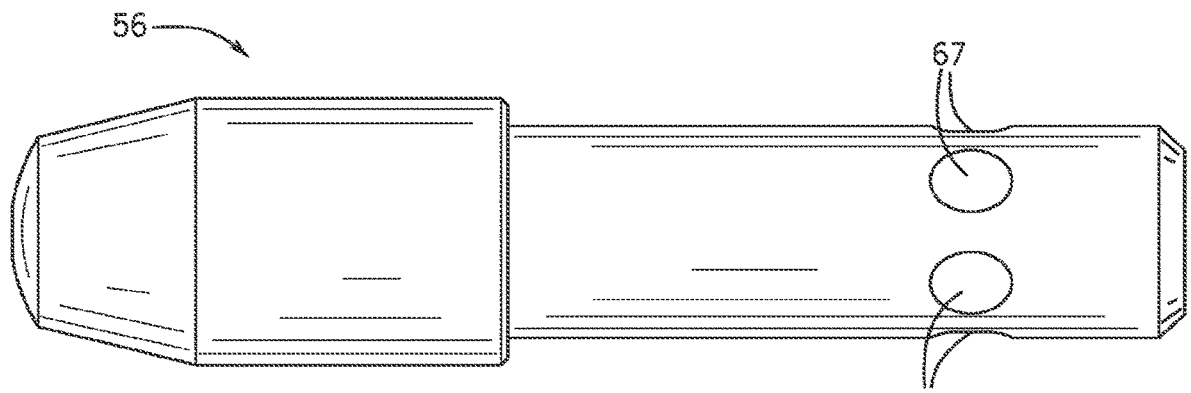
FIG. 22 is a first side view of a design for the contact tip of FIG. 20, in accordance with an embodiment.
Figure 23:
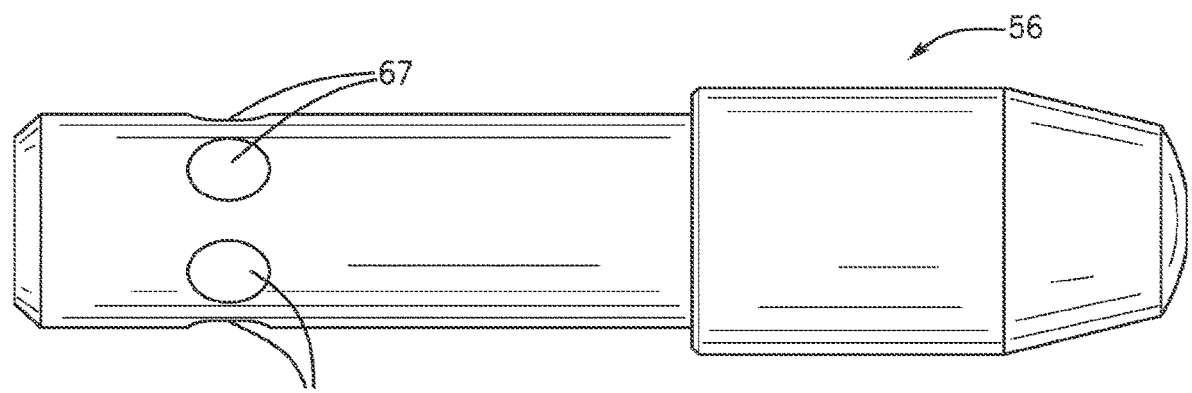
FIG. 23 is a second side view of a design for the contact tip of FIG. 20, in accordance with an embodiment.
Figure 24:
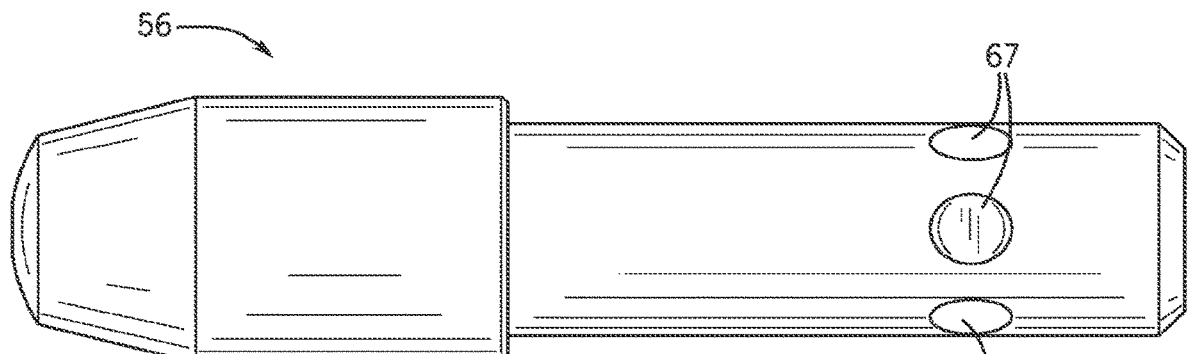
FIG. 24 is a top view of a design for the contact tip of FIG. 20, in accordance with an embodiment.
Figure 25:
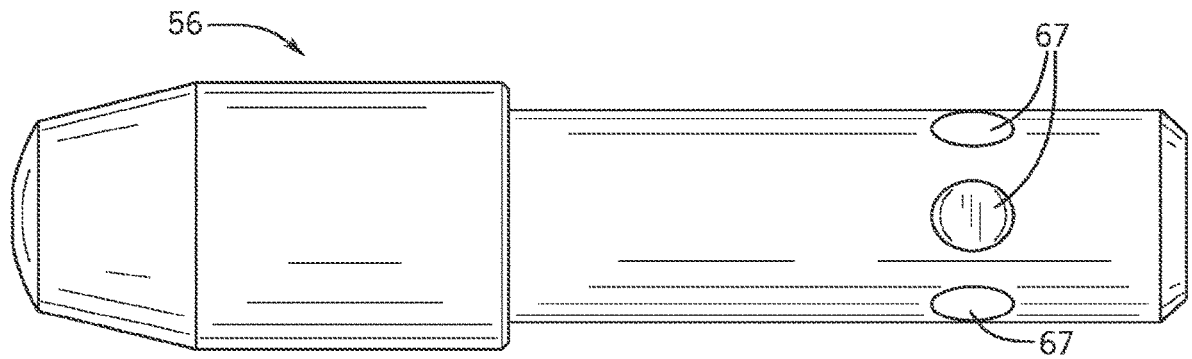
FIG. 25 is a bottom view of a design for the contact tip of FIG. 20, in accordance with an embodiment.
Figure 26:
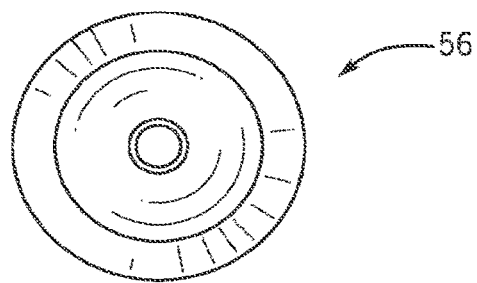
FIG. 26 is a front view of a design for the contact tip of FIG. 20, in accordance with an embodiment.
Figure 27:
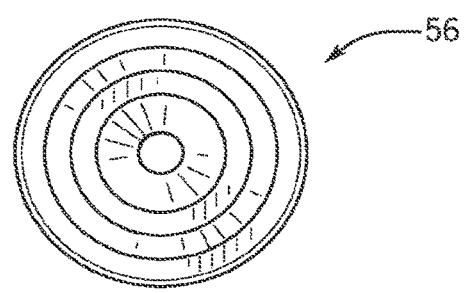
FIG. 27 is a rear view of a design for the contact tip of FIG. 20, in accordance with an embodiment.
Figure 28:
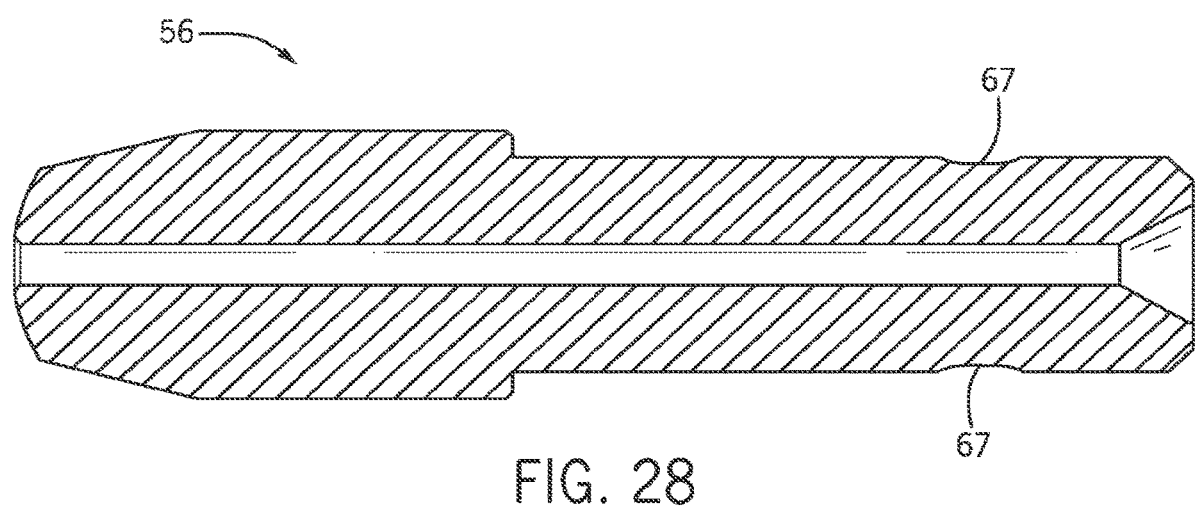
FIG. 28 is a cross-sectional cutaway view of a design for the contact tip of FIG. 20, in accordance with an embodiment.
Figure 29:
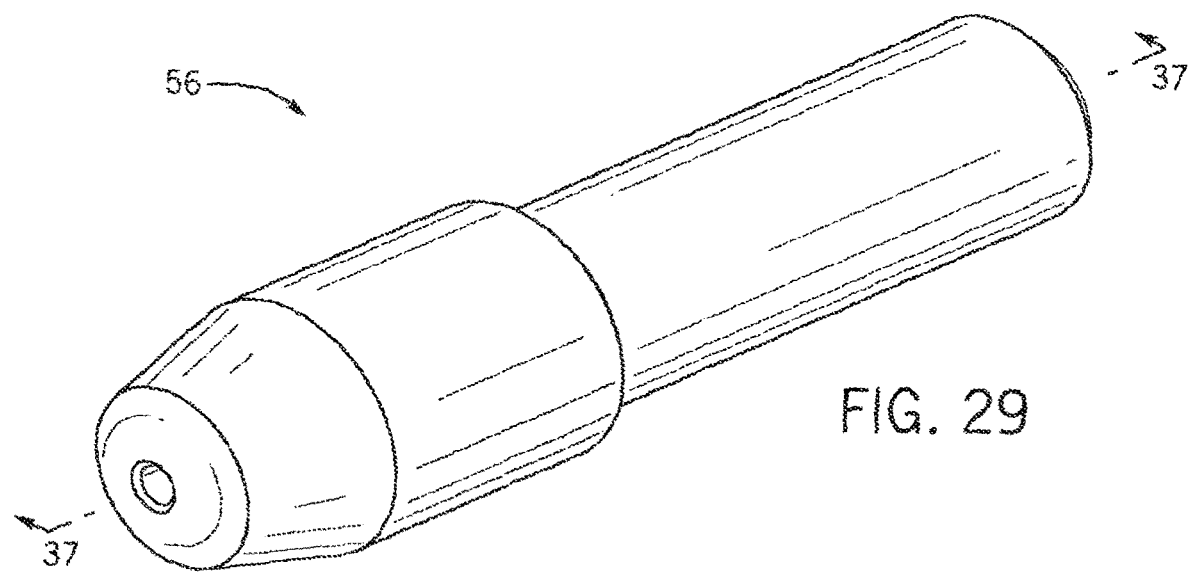
FIG. 29 is a front perspective view of a design for a contact tip not having a retention groove, in accordance with an embodiment.
Figure 30:
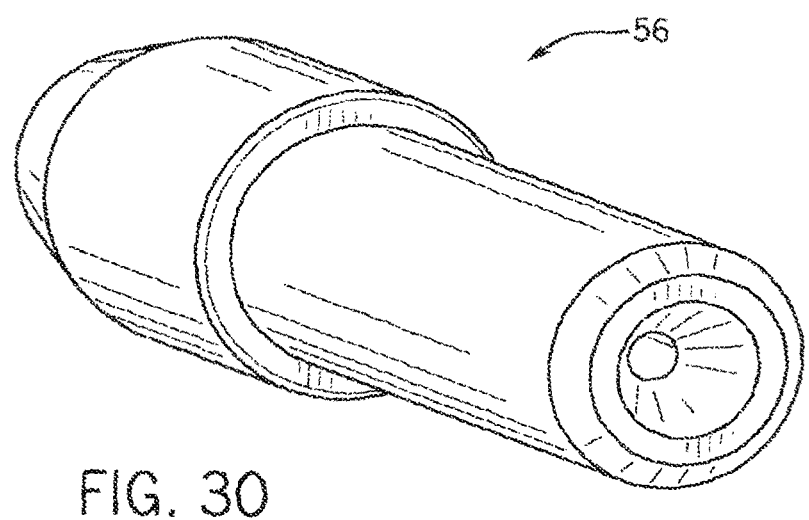
FIG. 30 is a rear perspective view of a design for the contact tip of FIG. 29, in accordance with an embodiment.
Figure 31:
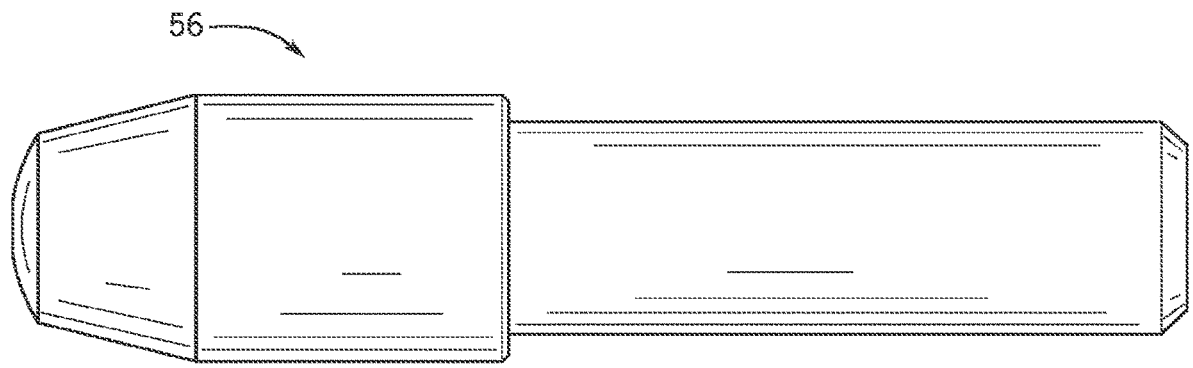
FIG. 31 is a first side view of a design for the contact tip of FIG. 29, in accordance with an embodiment.
Figure 32:
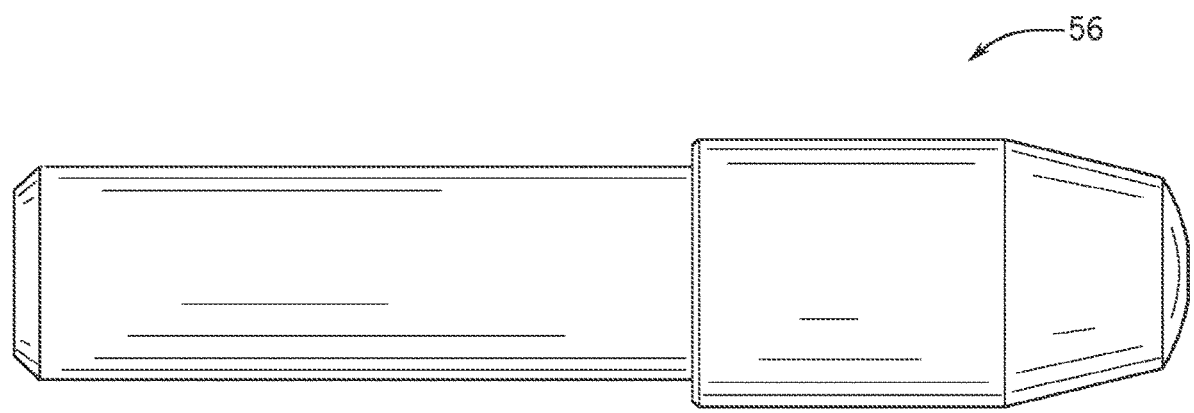
FIG. 32 is a second side view of a design for the contact tip of FIG. 29, in accordance with an embodiment.
Figure 33:
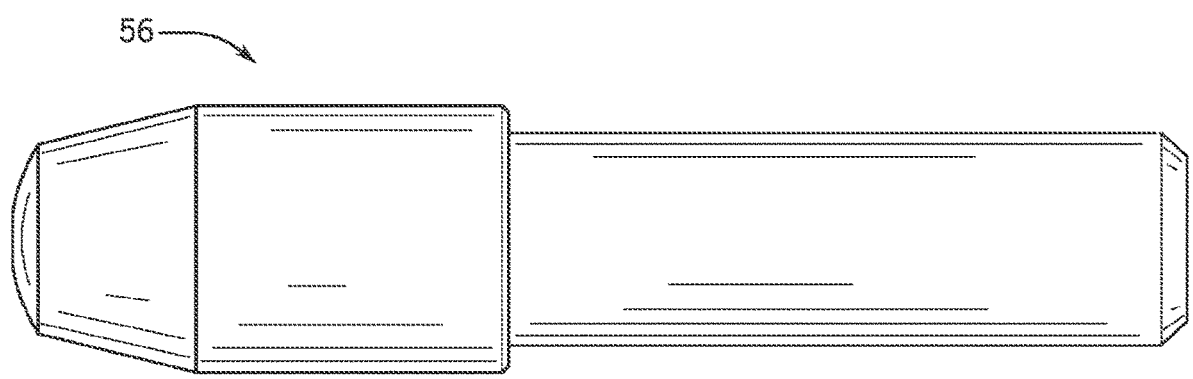
FIG. 33 is a top view of a design for the contact tip of FIG. 29, in accordance with an embodiment.
Figure 34:
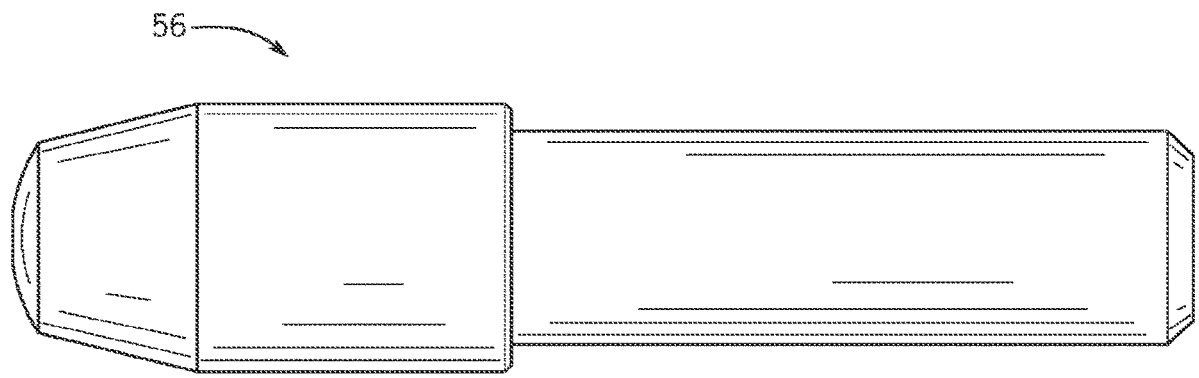
FIG. 34 is a bottom view of a design for the contact tip of FIG. 29, in accordance with an embodiment.
Figure 35:
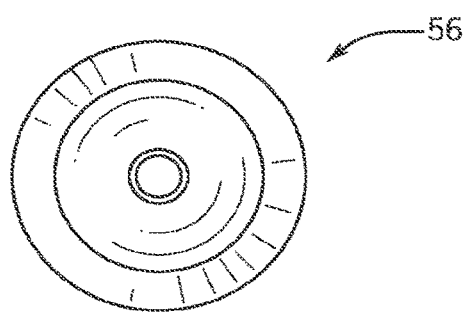
FIG. 35 is a front view of a design for the contact tip of FIG. 29, in accordance with an embodiment.
Figure 36:
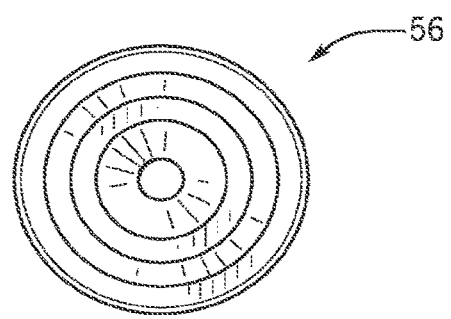
FIG. 36 is a rear view of a design for the contact tip of FIG. 29, in accordance with an embodiment.
Figure 37:
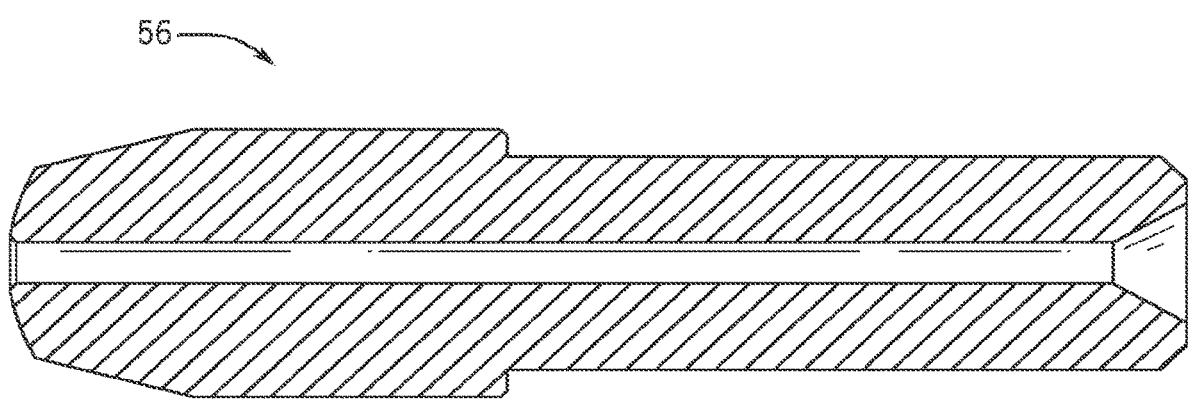
FIG. 37 is a cross-sectional cutaway view of a design for the contact tip of FIG. 29, in accordance with an embodiment.
Figure 38:
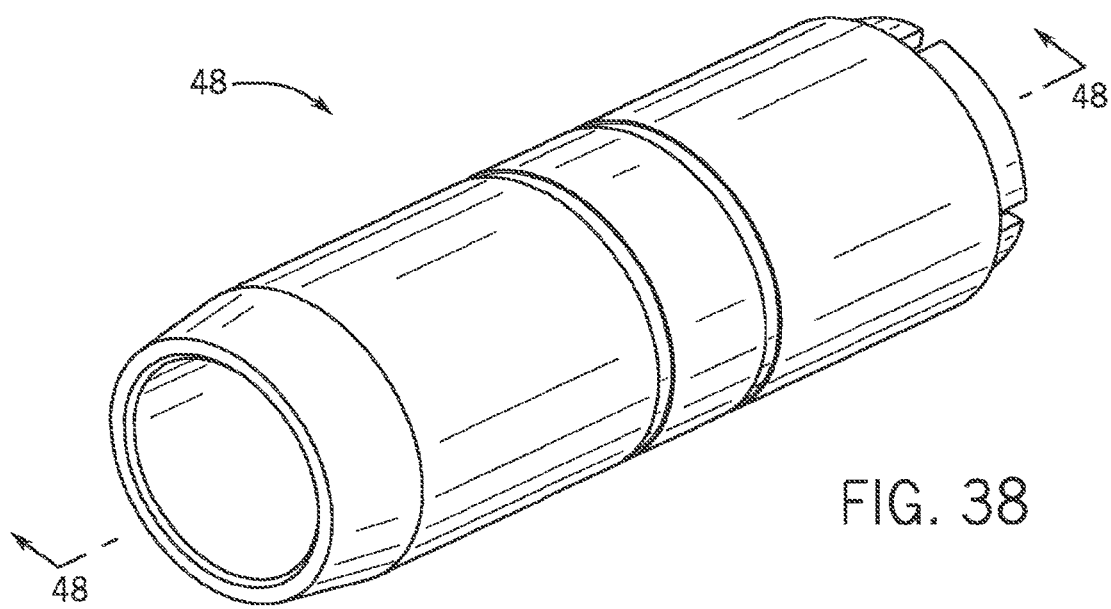
FIG. 38 is a front-side perspective view of a design for a welding nozzle, in accordance with an embodiment.
Figure 39:
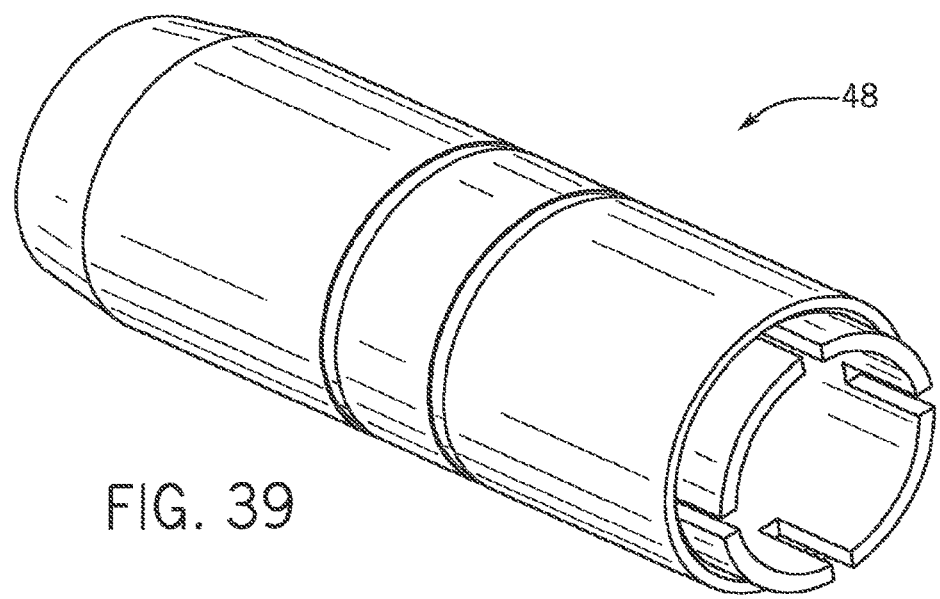
FIG. 39 is a rear-side perspective view of a design for the welding nozzle of FIG. 38, in accordance with an embodiment.
Figure 40:
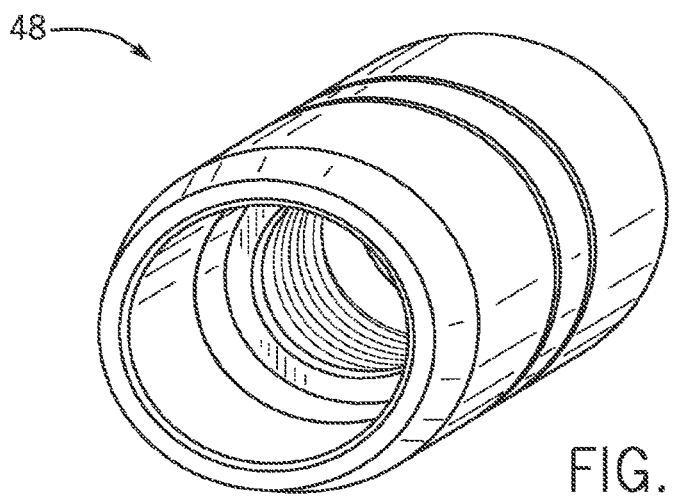
FIG. 40 is a front perspective view of a design for the welding nozzle of FIG. 38, in accordance with an embodiment.
Figure 41:
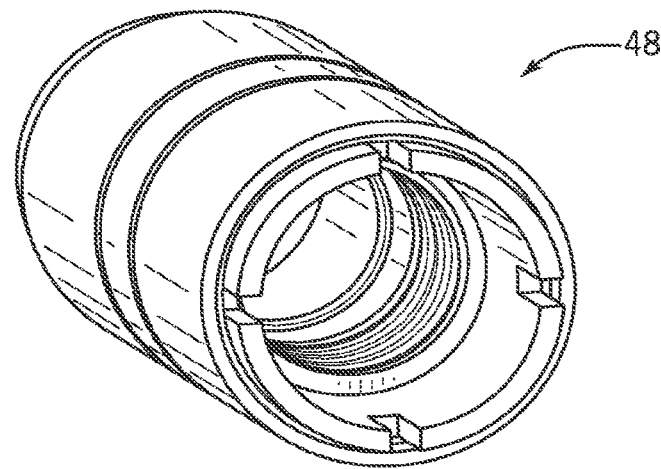
FIG. 41 is a rear perspective view of a design for the welding nozzle of FIG. 38, in accordance with an embodiment.
Figure 42:
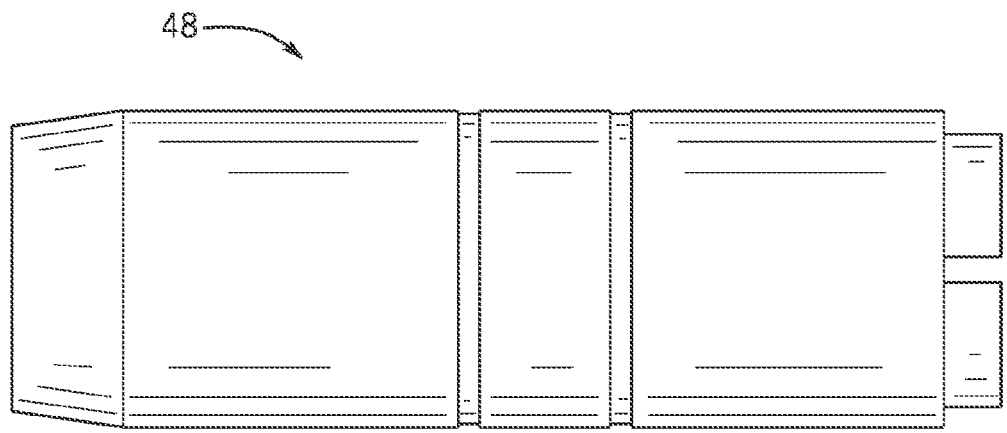
FIG. 42 is a first side view of a design for the welding nozzle of FIG. 38, in accordance with an embodiment.
Figure 43:
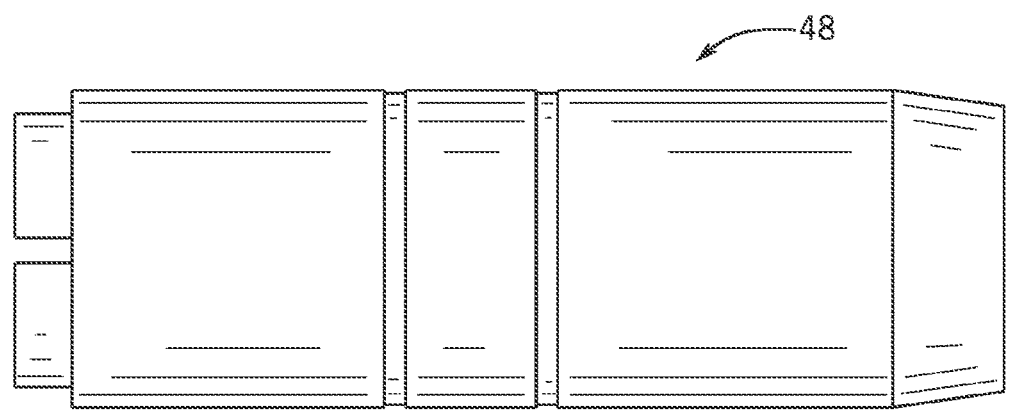
FIG. 43 is a second side view of a design for the welding nozzle of FIG. 38, in accordance with an embodiment.
Figure 44:
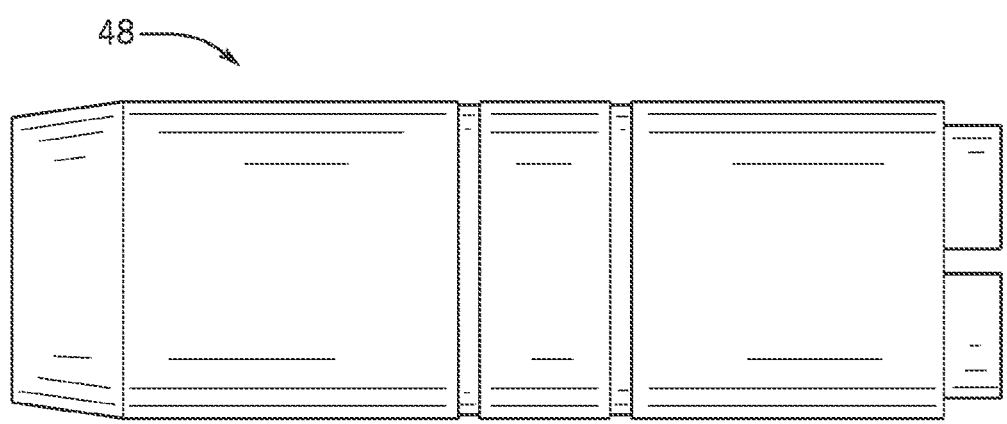
FIG. 44 is a top view of a design for the welding nozzle of FIG. 38, in accordance with an embodiment.
Figure 45:
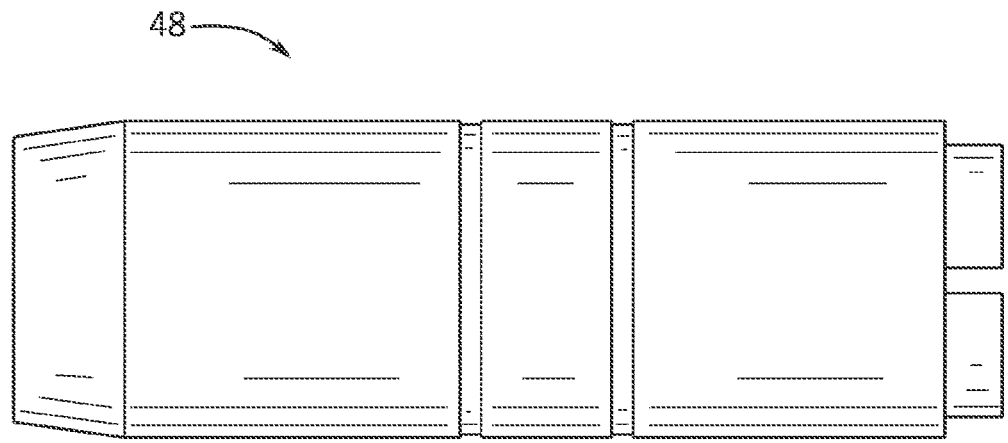
FIG. 45 is a bottom view of a design for the welding nozzle of FIG. 38, in accordance with an embodiment.
Figure 46:
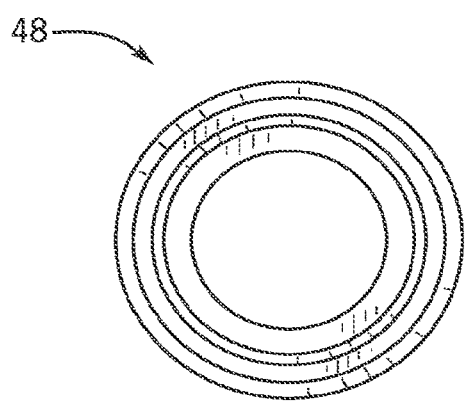
FIG. 46 is a front view of a design for the welding nozzle of FIG. 38, in accordance with an embodiment.
Figure 47:
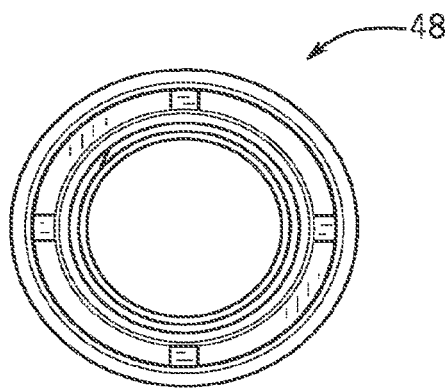
FIG. 47 is a rear view of a design for the welding nozzle of FIG. 38, in accordance with an embodiment.
Figure 48:
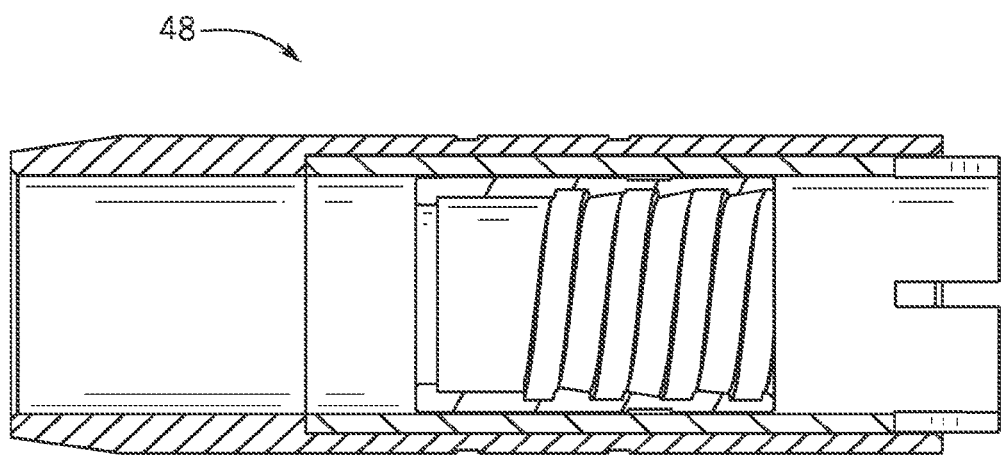
FIG. 48 is a cross-sectional cutaway view of a design for the welding nozzle of FIG. 38, in accordance with an embodiment.

FIG. 10 is a cross-sectional illustration of a portion of the contact tip 56 including a gas flow path 112 along the axial length of the contact tip 56. The shielding gas may travel along the gas flow path 112 from the neck 46 of the welding torch 16 along a weld cable liner 114. After exiting the neck 46, the shielding gas may travel through the contact tip cooling channels 110 (e.g., between an outer surface of the contact tip 56 and an inner surface of the receiving assembly 58) and radially out the gas-through ports 62 of the receiving assembly 58. As discussed above, as the shielding gas traverses the contact tip cooling channels 110 (e.g., axially flowing in the general direction of the central axis 108 of the welding torch 16), heat generated at a base portion 116 of the contact tip 56 during a welding operation may transfer to the shielding gas moving along the gas flow path 112. This may result in reduced temperatures at which the contact tip 56 operates. Additionally, the base portion 116 of the contact tip 56 may include a portion of the contact tip 56 that is received within the inner bore 74 of the receiving assembly 58.

After exiting through the gas-through ports 62 (e.g., in a radial direction generally perpendicular to the central axis 108), the shielding gas may be directed by the welding nozzle 48 away from the welding torch 16 and toward the work piece 26. As the shielding gas travels within the welding nozzle 48 after exiting the gas-through ports 62, an upper portion 118 of the contact tip 56 may transfer additional heat to the shielding gas as the shielding gas flows toward the work piece 26 along the gas flow path 112.

It may be appreciated that while FIGS. 8-10 of the present disclosure illustrate two of the contact tip cooling channels 110 formed between the contact tip 56 and the receiving assembly 58, one or more of the contact tip cooling channels 110 of the receiving assembly 58 may be formed around the contact tip 56 during actual implementation of the contact tip cooling channels 110. For example, the receiving assembly 58 may include one, two, three, or more of the contact tip cooling channels 110 depending on the configuration of the receiving assembly 58.

Further, the contact tip cooling channels 110 cumulatively may provide contact between greater than half of a surface area of the base portion 116 of the contact tip 56 and the shielding gas. For example, portions of the inner bore 74 of the receiving assembly 58 that are in contact with the contact tip 56 to provide partial and full securement of the contact tip 56 within the receiving assembly 58 may include less than half of the surface area of the base portion 116. Alternatively, in some embodiments, the portions of the inner bore 74 that are in contact with the contact tip 56 to provide partial and full securement of the contact tip 56 within the receiving assembly 58 may include greater than half of the surface area of the base portion 116. Accordingly, in various embodiments, the portions of the inner bore 74 of the receiving assembly 58 that are in contact with the contact tip 56 may contact between 20 and 80 percent of the surface area of the base portion 116 of the contact tip 56 while still maintaining the contact tip 56 in a partially or fully secured position within the receiving assembly 58.

While only certain features of the subject matter have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A method of securing a contact tip to a welding torch, comprising:
    partially securing the contact tip to a receiver of the welding torch by applying an axial force on the contact tip in a first direction into the receiver until a recess in the contact tip aligns with a retainer and the retainer engages the recess in the contact tip; and
    fully securing the contact tip to the receiver by securing the retainer to the contact tip, the securing of the retainer comprising securing a welding nozzle to the receiver to apply a radially inward force to the retainer while the retainer is engaged in the recess of the contact tip,
    wherein a retention band disposed around the retainer provides a first force on the retainer that partially secures the contact tip to the receiver and wherein the first force is provided via an abutment between the retention band and the retainer.

2. The method of claim 1, wherein applying the axial force and securing the welding nozzle is accomplished without a use of tools.

3. The method of claim 1, wherein the axial force urges the contact tip into the receiver and brings the contact tip into contact with the retainer that partially secures the contact tip to the receiver.

4. The method of claim 3, wherein the retainer is positioned within a radial orifice of the receiver.

5. The method of claim 1, wherein the retention band is elastically deformable.

6. The method of claim 1, wherein securing the welding nozzle to the receiver causes the retention band to abut the welding nozzle, thereby providing the radially inward force on the retainer that fully secures the contact tip to the receiver.

7. The method of claim 1, wherein the welding nozzle is secured to the receiver via screw threads.

8. The method of claim 1, further comprising:
removing the welding nozzle from the receiver; and
removing the contact tip from the receiver by applying an axial force on the contact tip in a second direction away from the receiver.

9. A method of securing a contact tip to a welding torch, comprising:

partially securing the contact tip to a receiver of the welding torch by applying an axial force on the contact tip in a first direction into the receiver until a recess in the contact tip aligns with a retainer and the retainer engages the recess in the contact tip;

fully securing the contact tip to the receiver by securing the retainer to the contact tip, the securing of the retainer comprising securing a welding nozzle to the receiver to apply a radially inward force to the retainer while the retainer is engaged in the recess of the contact tip; and cooling the contact tip using at least one cooling channel extending parallel to an axis of the receiver, wherein the at least one cooling channel abuts at least fifty percent of a surface area of the contact tip within the receiver.

* * * * *